US011316216B2

(12) United States Patent
Graves et al.

(10) Patent No.: US 11,316,216 B2
(45) Date of Patent: Apr. 26, 2022

(54) MODULAR HEAT EXCHANGERS FOR BATTERY THERMAL MODULATION

(71) Applicant: Dana Canada Corporation, Oakville (CA)

(72) Inventors: Garreth D. G. Graves, Mississauga (CA); Benjamin A. Kenney, Toronto (CA); Michael A. Martin, Hamilton (CA); Kenneth M. A. Abels, Oakville (CA); Lee M. Kinder, Oakville (CA)

(73) Assignee: Dana Canada Corporation, Oakville (CA)

( * ) Notice: Subject to any disclaimer, the term of this patent is extended or adjusted under 35 U.S.C. 154(b) by 367 days.

(21) Appl. No.: 16/660,708

(22) Filed: Oct. 22, 2019

(65) Prior Publication Data

US 2020/0136205 A1  Apr. 30, 2020

Related U.S. Application Data

(60) Provisional application No. 62/750,008, filed on Oct. 24, 2018.

(51) Int. Cl.
*H01M 10/63* (2014.01)
*H01M 10/625* (2014.01)
(Continued)

(52) U.S. Cl.
CPC ......... *H01M 10/63* (2015.04); *H01M 10/625* (2015.04); *H01M 10/6554* (2015.04);
(Continued)

(58) Field of Classification Search
CPC ............... H01M 10/63; H01M 10/625; H01M 10/6554; H01M 10/6556; H01M 10/6567;
(Continued)

(56) References Cited

U.S. PATENT DOCUMENTS

| 4,747,450 A | 5/1988 | Ikegame et al. |
| 5,740,015 A | 4/1998 | Donegan et al. |

(Continued)

FOREIGN PATENT DOCUMENTS

| FR | 3016479 A1 | 7/2015 |
| WO | 2019008000 A1 | 1/2019 |

OTHER PUBLICATIONS

ISA European Patent Office, International Search Report Issued in Application No. PCT/EP2018/068014, dated Aug. 28, 2018, WIPO, 4 pages.

*Primary Examiner* — Len Tran
*Assistant Examiner* — Gustavo A Hincapie Serna
(74) *Attorney, Agent, or Firm* — McCoy Russell LLP

(57) ABSTRACT

A modular heat exchanger for battery thermal management having a plurality of similarly constructed heat exchange elements affixed to a cover plate and fluidly coupled with one another via a single external manifold structure that functions as both an inlet manifold and an outlet manifold for each of the heat exchange elements. Rigidity is improved with alternating tabs or overlapping tabs between adjacent elements, and/or side edges between adjacent elements having cutouts for receiving stiffening ribs formed in the cover plate. The external manifold structure provides additional stiffening for the interconnected heat exchange elements.

19 Claims, 25 Drawing Sheets

(51) Int. Cl.
*H01M 10/6554* (2014.01)
*H01M 10/6556* (2014.01)
*H01M 10/6567* (2014.01)

(52) U.S. Cl.
CPC ... *H01M 10/6556* (2015.04); *H01M 10/6567* (2015.04); *H01M 2220/20* (2013.01)

(58) Field of Classification Search
CPC .......... H01M 2220/20; H01M 10/613; H01M 10/615; H01M 10/66; Y02E 60/10; F28F 3/046; F28F 3/12; F28D 1/035; F28D 21/00
USPC ...................................................... 165/80.4
See application file for complete search history.

(56) References Cited

U.S. PATENT DOCUMENTS

| | | | |
|---|---|---|---|
| 6,411,512 B1 | 6/2002 | Mankaruse et al. | |
| 8,708,035 B2 | 4/2014 | Bruckmann et al. | |
| 9,077,057 B2 | 7/2015 | Horii et al. | |
| 9,368,770 B2* | 6/2016 | Heise | H01M 6/5011 |
| 9,452,686 B2* | 9/2016 | Yang | H01M 10/60 |
| 9,520,625 B2 | 12/2016 | Ganz et al. | |
| 9,655,281 B2 | 5/2017 | Harvilchuck et al. | |
| 9,777,971 B2 | 10/2017 | Nagurny et al. | |
| 10,105,801 B2 | 10/2018 | Deckers et al. | |
| 10,236,546 B2 | 3/2019 | Huettel | |
| 2004/0144524 A1 | 7/2004 | Hwang et al. | |
| 2004/0238162 A1* | 12/2004 | Seiler | F02M 31/20 165/148 |
| 2008/0202730 A1* | 8/2008 | Onishi | F28D 15/00 165/104.28 |
| 2009/0258289 A1* | 10/2009 | Weber | H01M 10/613 429/120 |
| 2010/0071873 A1 | 3/2010 | Campagna | |
| 2011/0056668 A1 | 3/2011 | Taras et al. | |
| 2012/0156543 A1* | 6/2012 | Cicero | H01M 10/6556 429/120 |
| 2015/0079442 A1* | 3/2015 | Haussmann | F28F 9/026 429/120 |
| 2015/0086831 A1* | 3/2015 | Haussmann | H01M 10/6556 429/120 |
| 2015/0244037 A1* | 8/2015 | Jairazbhoy | H01M 10/647 429/120 |
| 2016/0036104 A1* | 2/2016 | Kenney | H01M 10/6557 429/120 |
| 2016/0146551 A1 | 5/2016 | Kolb | |
| 2016/0204486 A1* | 7/2016 | Kenney | H01M 10/6556 429/120 |
| 2016/0282059 A1* | 9/2016 | Schiehlen | H01M 10/623 |
| 2018/0309176 A1* | 10/2018 | Moschet | F28D 1/0475 |
| 2019/0143836 A1 | 5/2019 | Burrows et al. | |

* cited by examiner

MODULAR HEAT EXCHANGERS FOR BATTERY THERMAL MODULATION

CROSS-REFERENCE TO RELATED APPLICATIONS

This application claims the benefit of U.S. provisional application No. 62/750,008 filed on Oct. 24, 2018, the entirety of which is incorporated herein by reference.

TECHNICAL FIELD

The present disclosure relates to heat exchangers for thermal management of rechargeable batteries within an energy storage system of a battery electric vehicle (BEV) or hybrid electric vehicle (HEV), and particularly to such heat exchangers having a modular construction and including multiple heat exchanger elements.

BACKGROUND AND SUMMARY

Energy storage systems such as those used in BEVs and HEVs comprise rechargeable lithium-ion batteries. A typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells. The operation of the battery may be endothermic or exothermic, depending on temperature conditions.

A thermal modulation system for a rechargeable vehicle battery may comprise a plurality of "cold plate" heat exchangers. Each cold plate has a flat upper surface on which one or more battery cells and/or battery modules is supported, the cells and/or modules being in thermal contact with a heat transfer fluid circulating through one or more fluid flow passages inside the cold plate.

A cold plate is commonly constructed from a cover plate defining the flat upper surface, and a shaped base plate having a plurality of ridges which define the fluid flow passages, with the cover plate and base plate being joined by brazing in a brazing furnace. A typical thermal modulation system may comprise a plurality of such conventional cold plates joined together in series and/or parallel by conduits and fluid connections.

It may be advantageous to replace multiple conventional cold plates with a smaller number of larger cold plates, to improve reliability and reduce cost and complexity, by reducing the number of components and the number of leak-prone fluid connections between cold plates. However, there are several limitations which practically limit the size of conventionally constructed, brazed cold plates. For example, specialized equipment such as large presses are required for forming the ridges in large sized plates. In addition, the amount of energy required to heat the cold plate components to brazing temperatures increases with size. Also, furnace size may also be limited, thereby making furnace brazing of large cold plates difficult and/or uneconomical.

It is known to braze a plurality of conventionally sized base plates, with ridges formed by conventional tooling, to a single flat top plate, thereby allowing the overall size of the heat exchanger to be somewhat increased without incurring the added cost of re-tooling. This modular construction is known from commonly assigned U.S. patent application Ser. No. 14/972,463, published as US 2016/0204486 A1, which is incorporated herein by reference in its entirety.

However, there is a continued need for improved modular constructions for battery heat exchangers such as cold plates, so as to increase size of the cold plates, to improve flexibility in designing cold plates for specific applications, to improve reliability, and to allow for cost effective manufacture of larger cold plates.

To address at least some of the aforementioned problems, and in accordance with an aspect of the present disclosure, there is provided a heat exchanger, comprising a plurality of heat exchanger elements. Each of the heat exchanger elements preferably comprises: (i) a first plate having an inner surface and an outer surface; (ii) a second plate having an inner surface and an outer surface, wherein the first and second plates are joined together with their inner surfaces in opposed facing relation to one another, and with portions of the inner surfaces being spaced apart from one another; (iii) at least one fluid flow passage adapted for flow of a heat transfer fluid, and located between the spaced apart portions of the inner surfaces of the first and second plates; (iv) at least one first inlet port for supplying the heat transfer fluid to the plurality of fluid flow passages; and (v) at least one first outlet port for discharging the heat transfer fluid from the plurality of fluid flow passages.

According to an aspect, the heat exchanger further comprises an external manifold portion comprising: (i) a second inlet port for supplying the heat transfer fluid to the external manifold portion; (ii) a second outlet port for discharging the heat transfer fluid from the external manifold portion; (iii) an inlet manifold channel in fluid communication with the at least one first inlet port of each heat exchanger element and with the second inlet port of the external manifold portion; and (iv) an outlet manifold channel in fluid communication with the at least one first outlet port of each heat exchanger element and with the second outlet port of the external manifold portion.

According to an aspect, the plurality of heat exchanger elements are arranged in a substantially planar array, and wherein the heat exchanger further comprises at least one stiffening elements arranged between adjacent heat exchanger elements in the array, to limit deflection between the adjacent heat exchanger elements in the array.

According to an aspect, the second plate of each heat exchanger element includes a planar peripheral flange surrounding the at least one fluid flow passage; wherein the peripheral flange defines a sealing surface along which the inner surface of the second plate is sealingly joined to the inner surface of the first plate; wherein the first plate has a sealing surface along which the inner surface of the first plate is sealingly joined to the sealing surface of the second plate; and wherein at least one of the first plate and the second plate includes a pair of side edges, wherein the side edges of the second plate are defined by opposed outer edges of the peripheral flange.

According to an aspect, at least one of the side edges includes at least one outermost edge portion, each of which extends along at least a portion of the side edge, and an innermost edge portion extending along at least a portion of the side edge, wherein a first axis is defined along the at least one outermost edge portion, and a second axis is defined along the at least one innermost edge portion; wherein the second plates of the heat exchanger elements are arranged side-by-side such that each of the second plates has at least one of its side edges positioned with its first axis located between the first and second axes of the side edge of an adjacent one of the second plates, the side edges of adjacent pairs of second plates being substantially co-planar with one another.

According to an aspect, the first and second axes are parallel to one another, and transverse to an axis along which the external manifold extends.

According to an aspect, at least one of the side edges includes a plurality of outermost edge portions and a plurality of innermost edge portions, wherein the outermost and innermost edge portions alternate with one another along a length of the at least one side edge; wherein the outermost edge portions and the innermost edge portions have a complementary arrangement and shape, such that each of the outermost edge portions defines a male portion and each of the innermost edge portions defines a female portion in which the male portion is received, so as to provide a plurality of stiffening elements; wherein a gap is provided between adjacent pairs of side edges, the gap being tortuous and following along the innermost and outermost edge portions of the side edges.

According to an aspect, the first plates of the plurality of heat exchanger elements are integrally connected together to provide an integral first plate to which all the second plates are sealingly joined; wherein the integral first plate has an area which is at least as great as a combined area of the plurality of second plates.

According to an aspect, the first plates of the plurality of heat exchanger elements are separately formed, such that both the first plate and the second plate of each heat exchanger element include a pair of said side edges; wherein, within each of the heat exchanger elements, each of the innermost edge portions of the first plate overlies one of the outermost edge portions of the second plate, and each of the outermost edge portions of the first plate overlies one of the innermost edge portions of the second plate, so as to provide alternating upper and lower rows of projecting tabs along the side edges of the first and second plates; wherein, with the heat exchanger elements arranged side-by-side in the array, an adjacent pair of the heat exchanger elements is arranged with the upper row of projecting tabs of a first heat exchanger element overlapping the lower row of projecting tabs of an adjacent second heat exchanger element, and with the upper row of projecting tabs of the second heat exchanger element overlapping the lower row of projecting tabs of the first heat exchanger element.

According to an aspect, the upper row of projecting tabs of the first heat exchanger element is substantially co-planar with the upper row of projecting tabs of the second heat exchanger element; and wherein the lower row of projecting tabs of the first heat exchanger element is substantially co-planar with the lower row of projecting tabs of the second heat exchanger element.

According to an aspect, the overlapping projecting tabs of the first and second heat exchanger elements are secured together.

According to an aspect, the first plates of the plurality of heat exchanger elements are separately formed, such that both the first plate and the second plate of each heat exchanger element include a pair of side edges; wherein an upper or lower projecting tab is defined along at least one side of each of the heat exchanger elements, each upper projecting tab being formed by a portion of the first plate, inward of one of the side edges of the first plate, projecting outwardly beyond the side edge of the second plate, and each lower projecting tab being formed by a portion of the second plate, inward of one of the side edges of the second plate, projecting outwardly beyond the side edge of the first plate; wherein, with the heat exchanger elements arranged side-by-side in the array, an adjacent pair of the heat exchanger elements is arranged with the upper projecting tab of a first heat exchanger element overlapping the lower projecting tab of an adjacent second heat exchanger element; and wherein each pair of upper and lower projecting tabs in overlapping arrangement comprises the at least one stiffening element.

According to an aspect, the upper projecting tab of the first heat exchanger element is substantially co-planar with the upper projecting tab of the second heat exchanger element; and/or wherein the lower projecting tab of the first heat exchanger element is substantially co-planar with the lower projecting tab of the second heat exchanger element.

According to an aspect, the overlapping upper and lower projecting tabs of the first and second heat exchanger elements are secured together.

According to an aspect, the side edges of the second plates of adjacent heat exchanger elements are spaced apart from one another; wherein the first plates of the plurality of heat exchanger elements are integrally connected together to provide an integral first plate having an inner surface and an outer surface, wherein the second plates are sealingly joined to the inner surface of the integral first plate, and the integral first plate has an area which is greater than a combined area of the plurality of second plates; wherein the at least one stiffening element comprises a plurality of spaced apart ribs formed in the first plate, and located between the side edges of adjacent heat exchanger elements.

According to an aspect, the ribs are elongated parallel to an axis which is perpendicular to the side edges of the second plates; wherein the external manifold portion is provided along the outer surface of the integral first plate; and wherein the external manifold portion extends along the axis which is perpendicular to the side edges of the second plates.

According to an aspect, in each of the heat exchanger elements, the first plate has a pair of side edges and the first and second plates of each heat exchanger element are sealingly joined together; and wherein the external manifold portion comprises a flattened tubular structure enclosing both the inlet manifold channel and the outlet manifold channel, the external manifold portion extending across all the heat exchanger elements along an axis which is perpendicular to the side edges of the first and second plates; wherein the at least one stiffening element comprises a plurality of bends in the external manifold portion, wherein the bends creating first and second portions of the external manifold portion which are located in different planes and which are separated by inclined shoulders; wherein the first portions located in a first plane and the second portions located in a second plane, the first and second planes being substantially parallel and spaced apart by approximately a thickness of the heat exchanger elements.

According to an aspect, each of the first portions extends along an outer surface of one of the second plates, and each of the second portions is located in an aperture provided between an adjacent pair of heat exchanger elements.

According to an aspect, each of the inclined shoulders is formed by a pair of opposite bends proximate to the side edges of the first and second plates.

According to an aspect, each of the first portions of the external manifold portion is mechanically secured to one of the heat exchanger elements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Exemplary embodiments of the present disclosure will now be described, by way of example, with reference to the accompanying drawings, in which.

DETAILED DESCRIPTION

The figures herein show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1A:
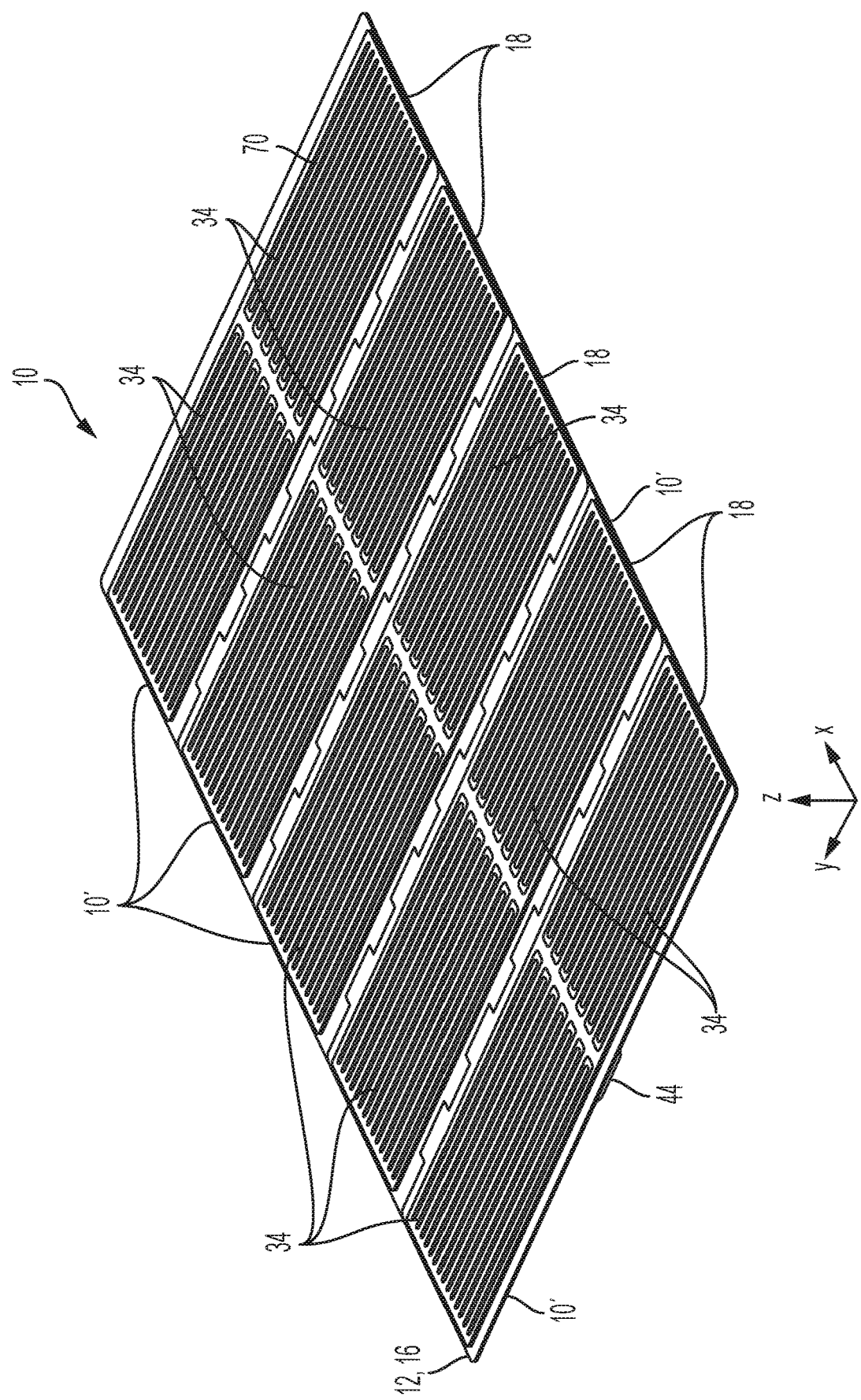
FIG. 1A is a top perspective view of a cold plate heat exchanger according to a first embodiment.
Figure 1B:
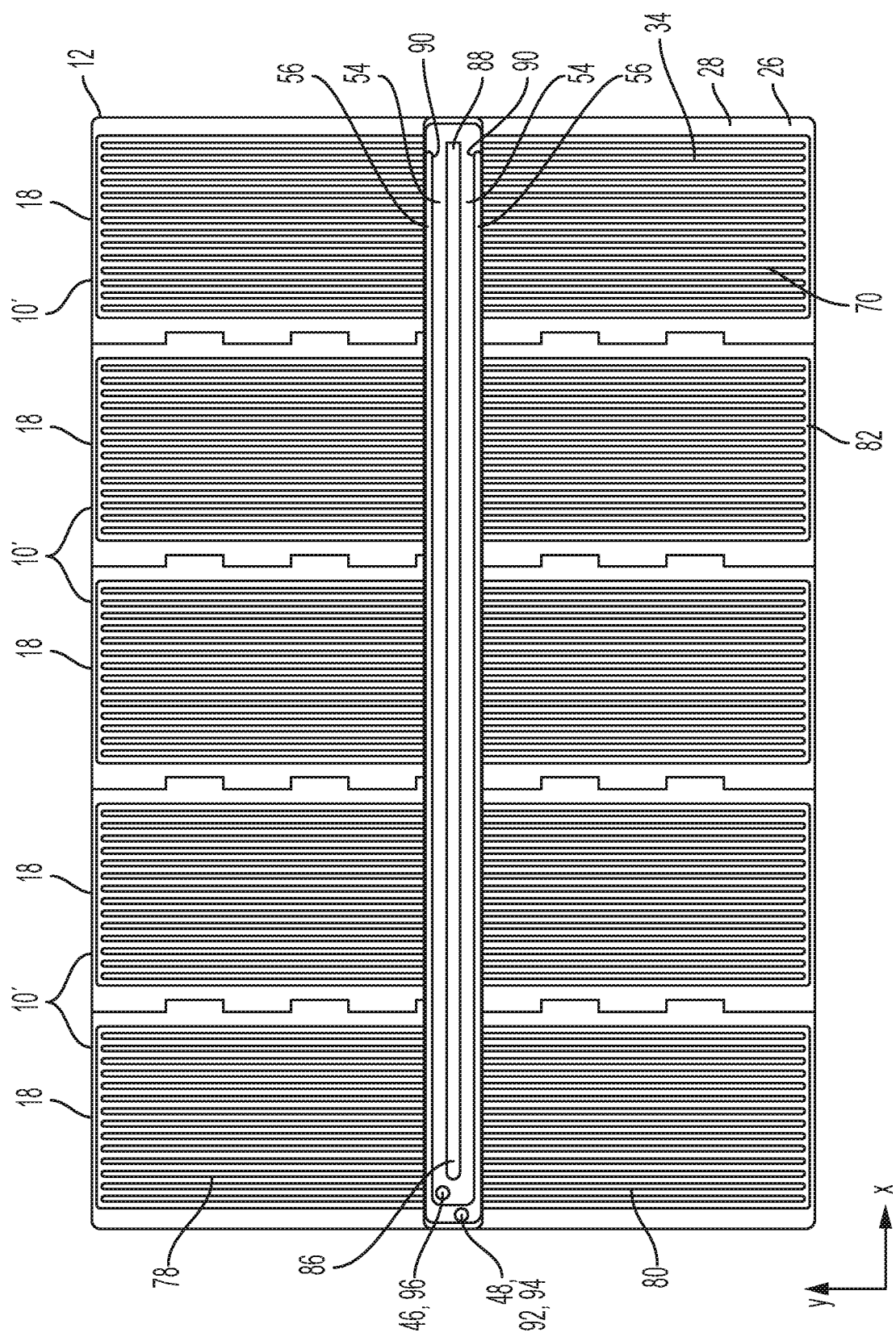
FIG. 1B is a bottom plan view of a cold plate heat exchanger as in FIG. 1A.
Figure 2:
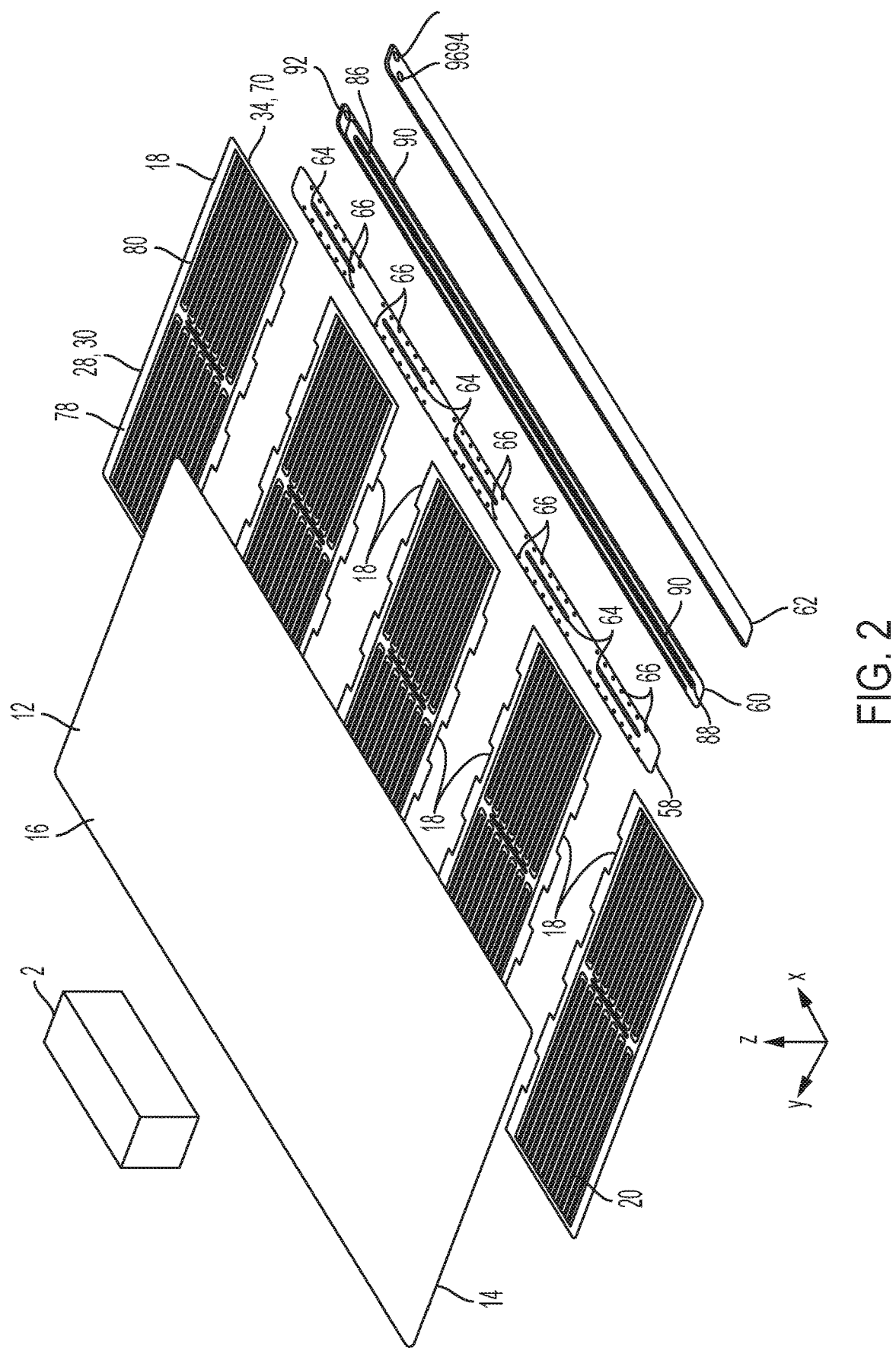
FIG. 2 is an exploded perspective view of a cold plate heat exchanger as in FIG. 1A.
Figure 3:
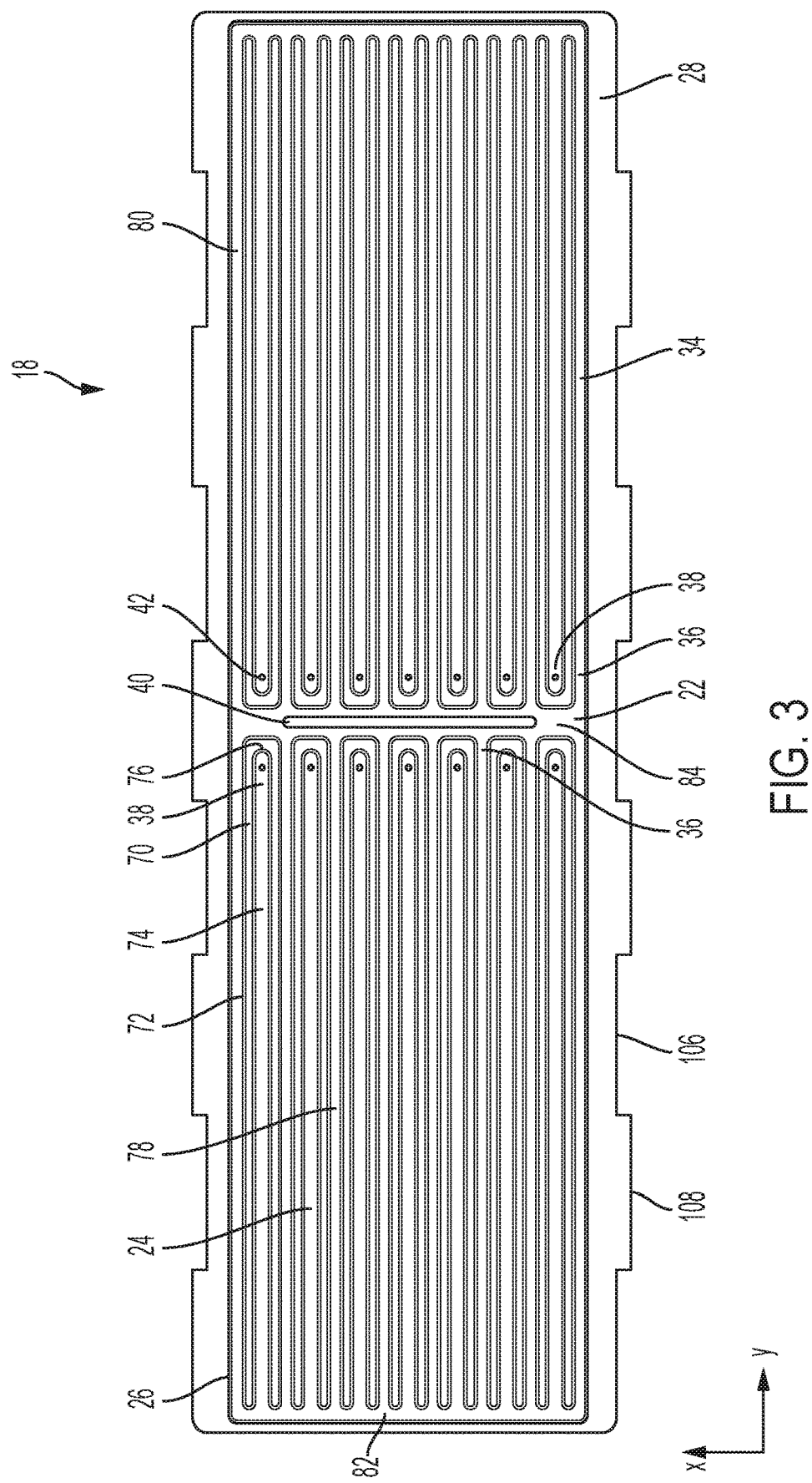
FIG. 3 is a bottom plan view of a second plate of a heat exchanger as in FIG. 1A.
Figure 4:
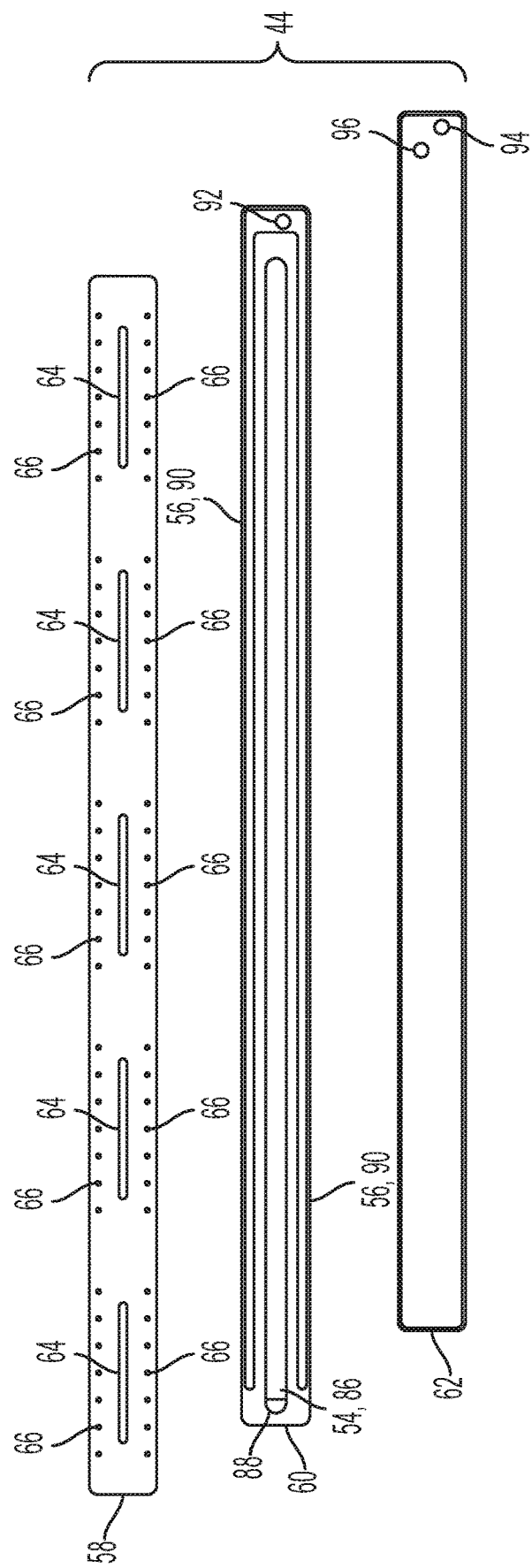
FIG. 4 shows the plates making up an external manifold portion of a heat exchanger as in FIG. 1A.
Figure 5:
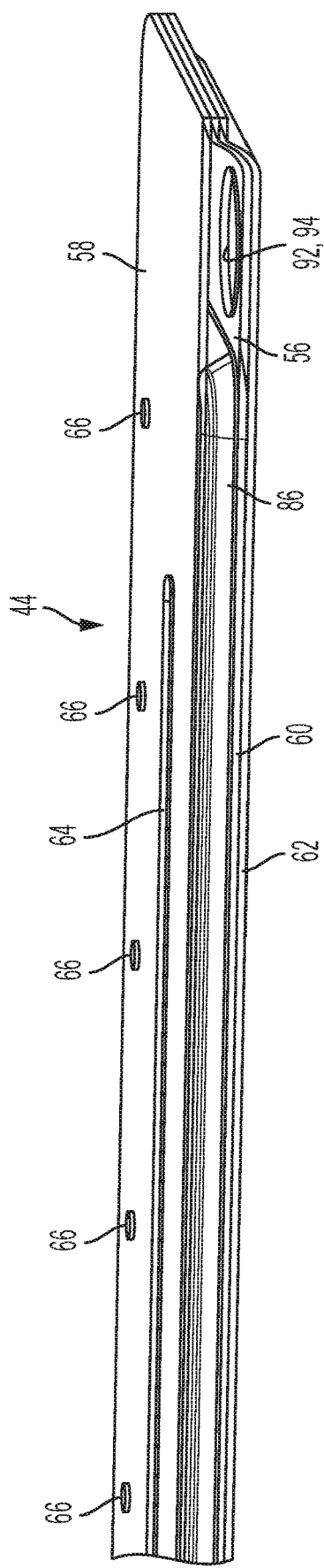
FIG. 5 is a partial, enlarged transverse cross-section through a heat exchanger as in FIG. 1A.

As an overview, FIGS. 1A, 1B, and 2 (and FIGS. 10 and 11) show exemplary heat exchangers having a novel modular construction, which the present inventors discovered (in various embodiments illustrated and described herein) enables heat exchangers of different dimensions to be constructed from a small (or smaller) number of parts and/or with simplified manufacturing/construction techniques (as compared to existing designs). FIG. 2 shows an exploded view of an exemplary heat exchanger comprising a substantially flat cover plate, a plurality of second plates (each preferably stamped to define a plurality of fluid flow passages), and an external manifold portion adapted to provide thermal regulating fluid (or heat transfer fluid) to each of the second plates and to receive the thermal regulating fluid discharged from each of the second plates, with the second plates sandwiched between the cover plate and the external manifold portion. FIG. 3 shows an exemplary second plate in greater detail, illustrating, for example, novel U-shaped or counterflow fluid flow paths developed by the present inventors that provide improved heat transfer from/to a second plate material and/or a heat transfer surface attached thereto. FIGS. 4 and 5 show in greater detail various aspects of an exemplary external manifold that the present inventors discovered (in various embodiments disclosed herein) enables a single external manifold structure to function as both an inlet manifold (to provide input fluid to a plurality of heat exchanger elements) and an outlet manifold (to receive output fluid from the plurality of heat exchanger elements).

Figure 15A:
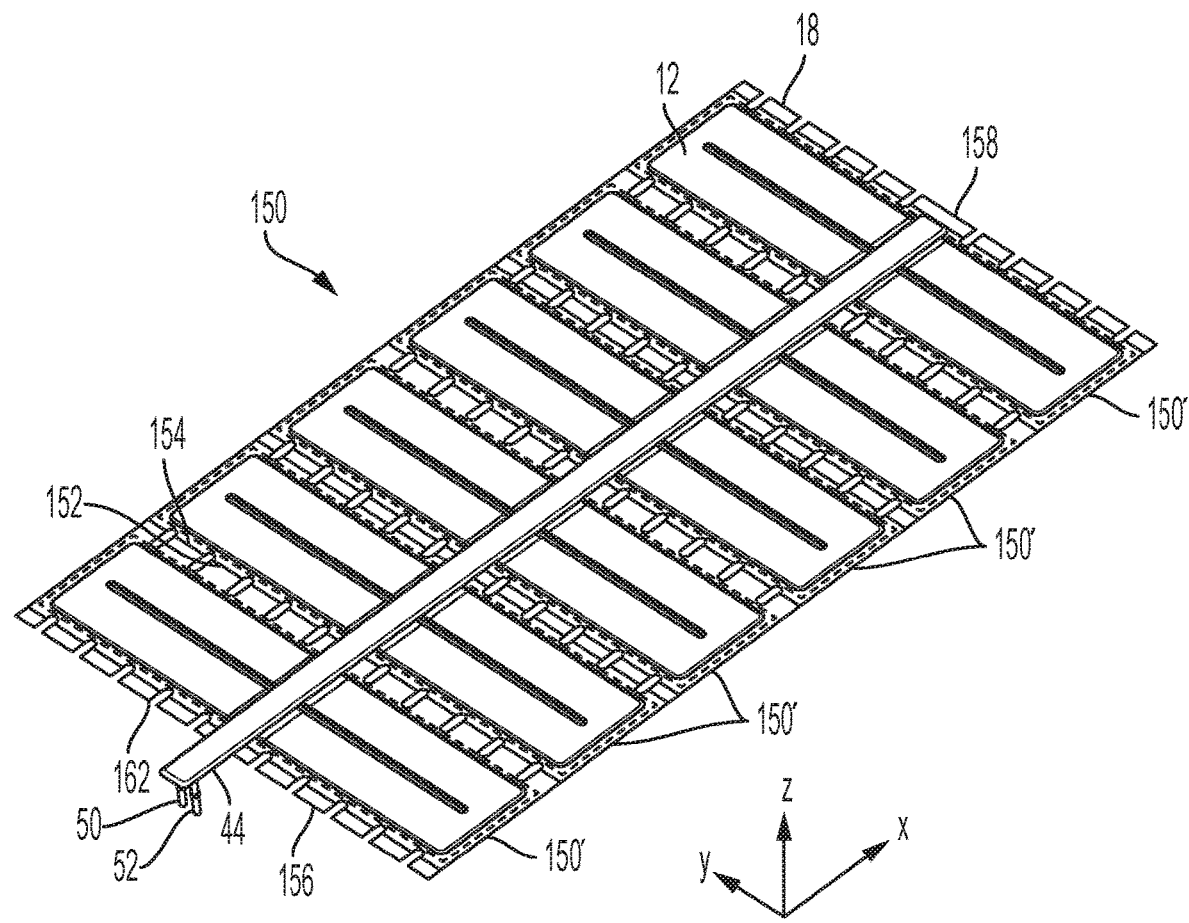
FIG. 15A is a bottom perspective view of a heat exchanger as in FIG. 14.
Figure 15B:
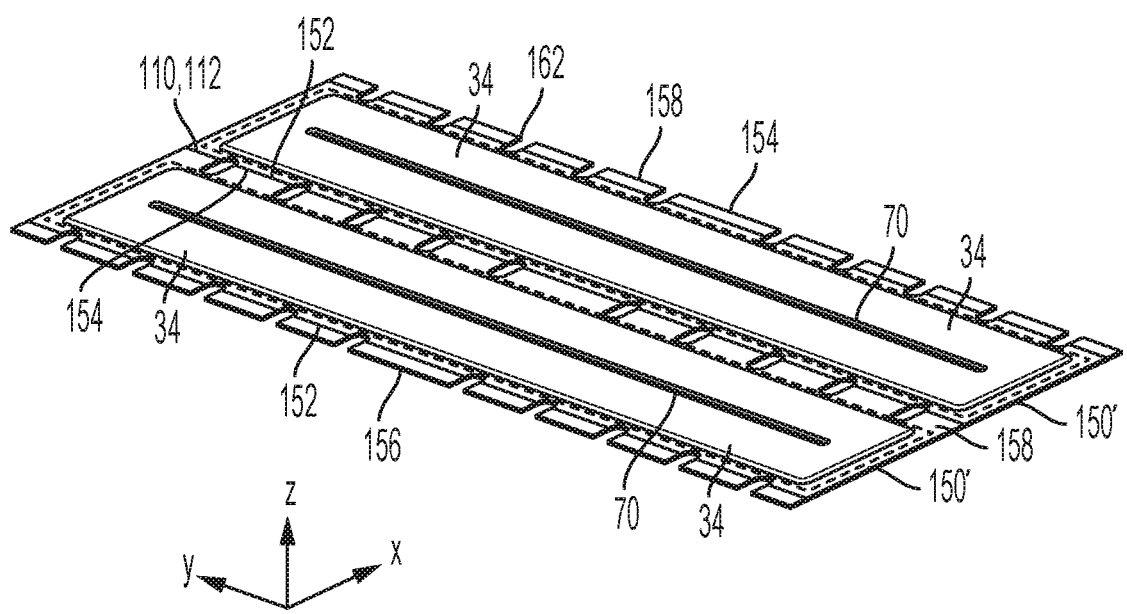
FIG. 15B is a perspective view showing two heat exchanger elements of a heat exchanger as in FIG. 14 joined together.
Figure 16:
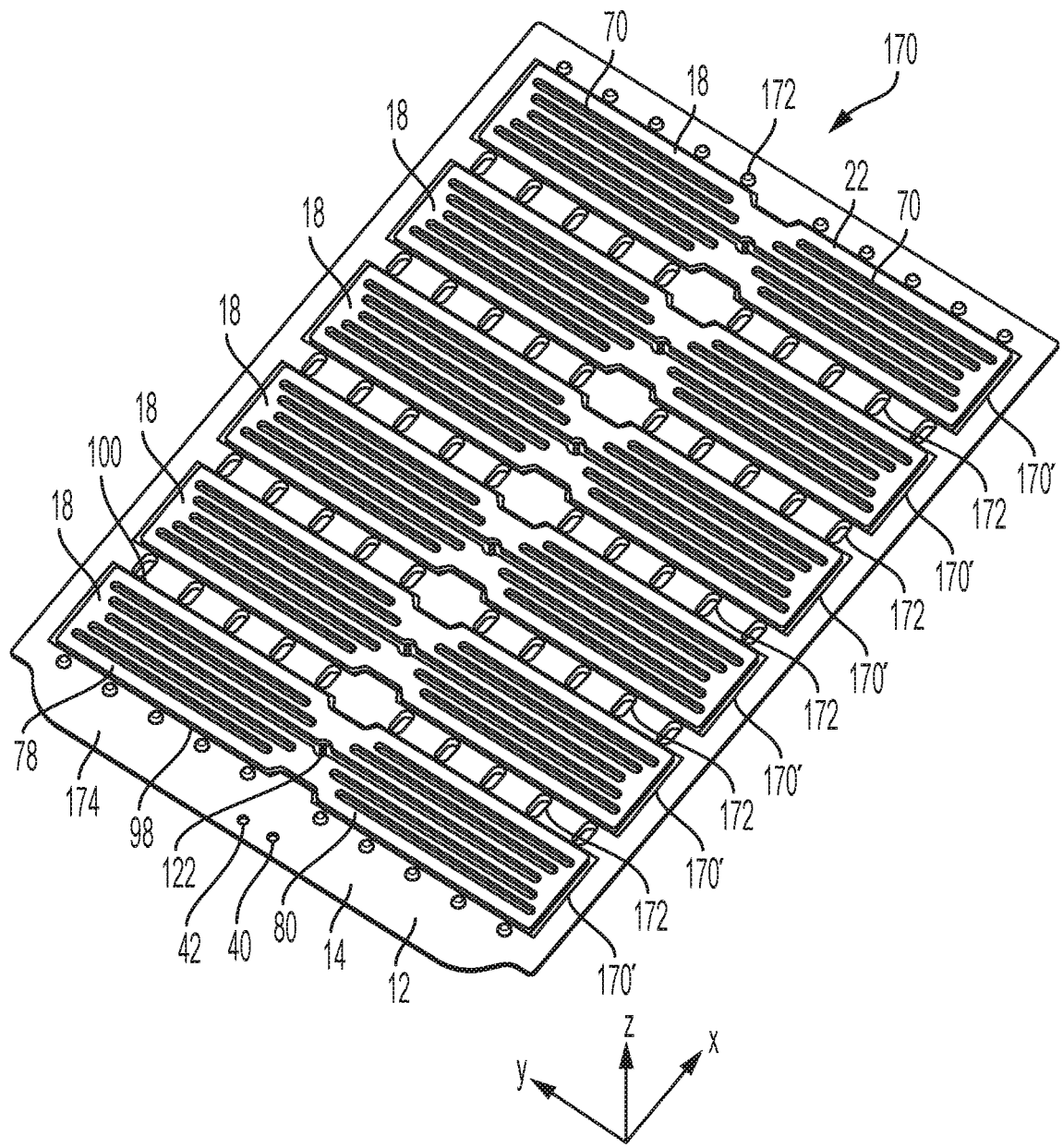
FIG. 16 is a top perspective view of a heat exchanger according to an alternate embodiment.
Figure 17:
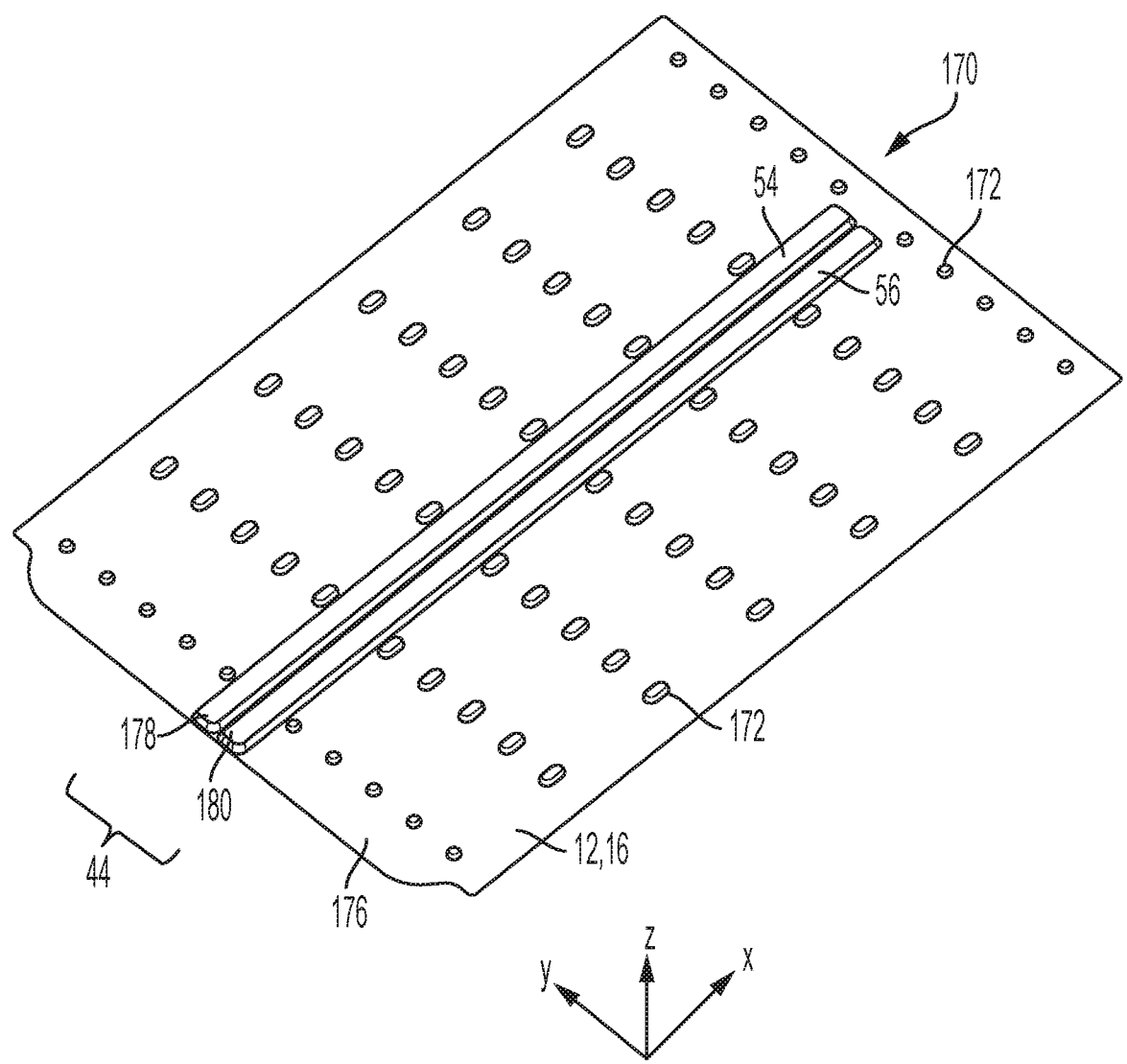
FIG. 17 is a bottom perspective view of a heat exchanger as in FIG. 16.
Figure 18:
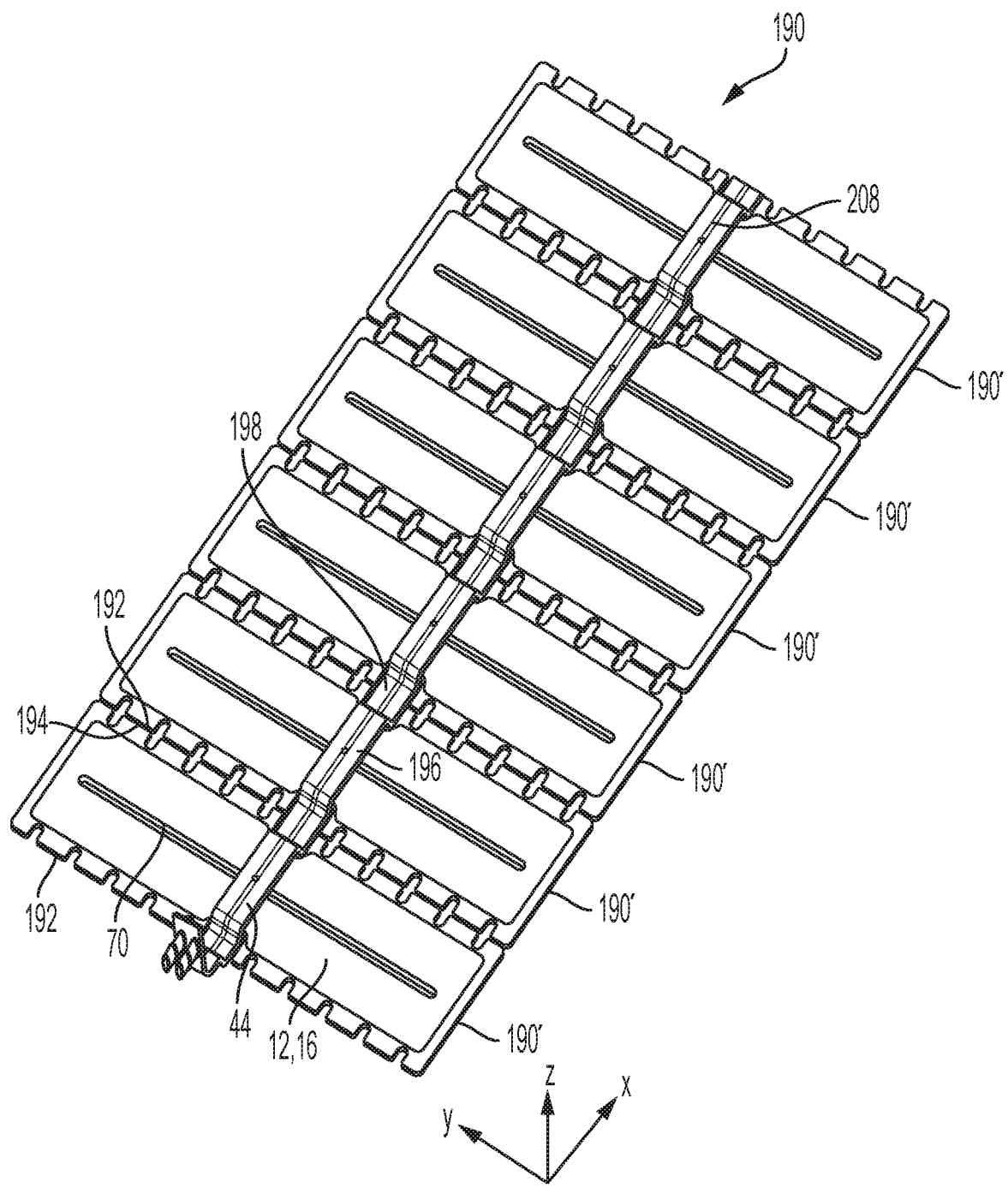
FIG. 18 is a top perspective view of a heat exchanger according to an alternate embodiment.
Figure 19:
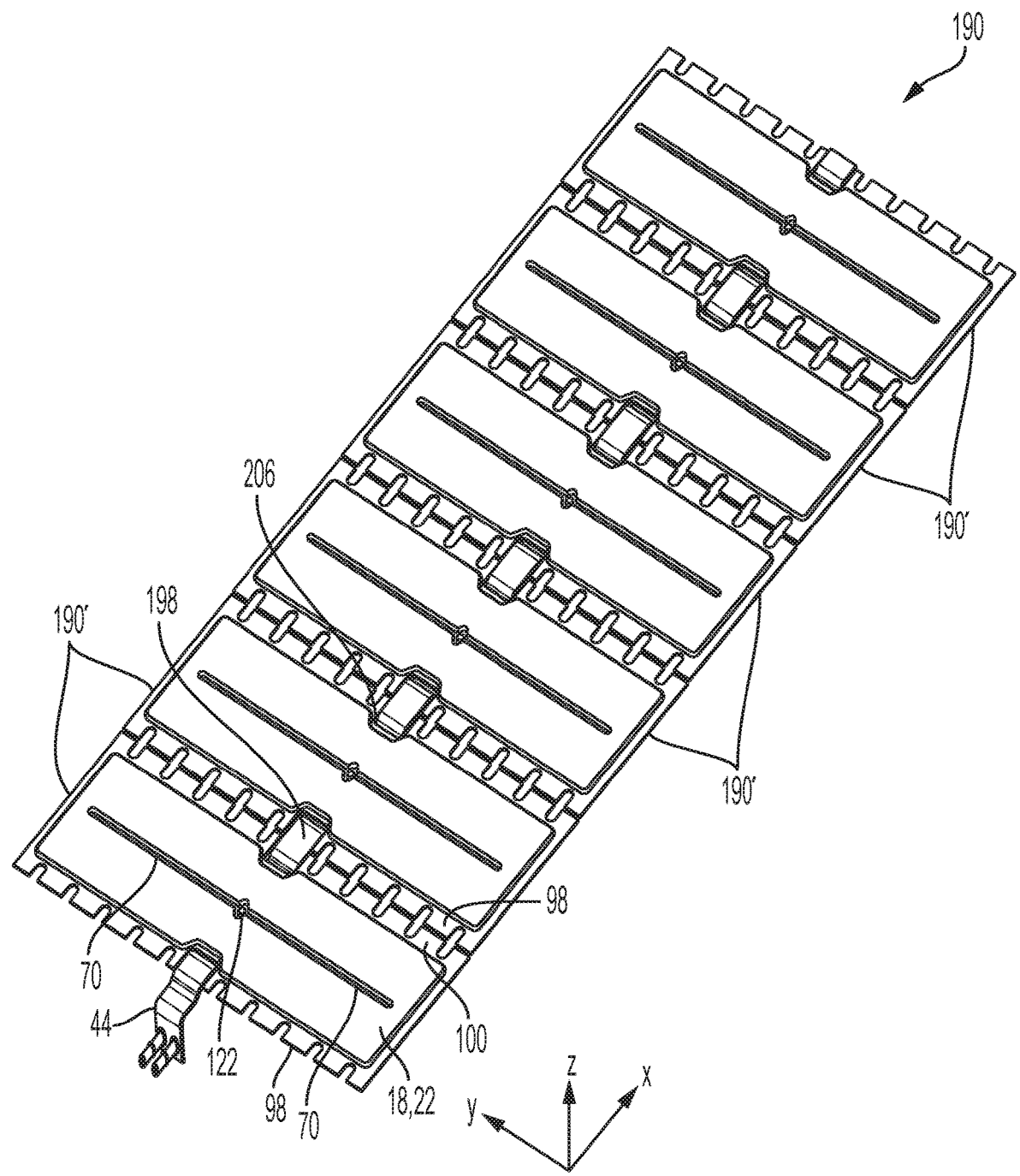
FIG. 19 is a bottom perspective view of a heat exchanger as in FIG. 18.

FIGS. 6, 7A, 7B, 8, 9A, and 9B (and FIGS. 12 and 13) show various embodiments pertaining to what may be referred to as jigsaw features (or cutouts and/or tabs and/or overlapping tabs) along correspondingly mating edges of adjacent second plates (with comparison to existing designs), which the present inventors discovered avoid weaknesses between adjacent second plates. FIGS. 14, 15A, 15B, and 15C show embodiments having cutouts along side edges (or side edges interrupted by cutouts) between adjacent second plates, and FIGS. 16 and 17 show embodiments wherein stiffening ribs may be formed in the first (cover) plate that extend into cutout openings/gaps along correspondingly mating edges of adjacent second plates. Finally, FIGS. 18-21 show embodiments wherein a heat exchanger comprises a plurality of modules, each having a cover plate and a second plate of substantially the same size/area, with an external manifold portion (having bends to increase rigidity and stiffness) interconnecting the modules together.

Referring now to FIGS. 1A to 5, there is shown a cold plate heat exchanger 10 according to a first embodiment. Heat exchanger 10 comprises a generally flat first plate 12 (also referred to herein as "cover plate") having inner and outer surfaces 14, 16 and a plurality of formed second plates 18 (also referred to herein as "base plates"), each having inner and outer surfaces 20, 22. The first plate 12 is shown as being transparent in FIG. 1A.

As illustrated in FIG. 2, the outer surface 16 of first plate 12 defines a generally flat surface upon which a plurality of battery cells and/or battery modules 2 (FIG. 2) are stacked or supported, and which therefore serves as the primary heat transfer surface of the heat exchanger 10. In the illustrated embodiment, the outer surface 16 of first plate is completely flat and free of any fluid fittings, manifolds, etc., and therefore the entire surface area of outer surface is available for heat transfer with the battery cells and/or battery modules.

In preferred embodiments, heat exchanger 10 comprises a plurality of heat exchanger elements 10', each of which comprises the first plate 12, and one of the second plates 18. Therefore, in preferred embodiments, the first plates of the individual heat exchanger elements 10' are integrally connected together to provide integral first plate 12 to which all the second plates 18 are sealingly joined. Preferably, the integral first plate 12 has an area which is at least as great as the combined area of the second plates 18.

As shown in FIG. 2, heat exchanger 10 includes five identical second plates 18 and an integral first plate 12 which connects the heat exchanger elements into a single unit in which the heat exchanger elements 10' are arranged as a substantially planar array. As will be appreciated, the first plate 12 (in some embodiments) is preferably completely flat and does not have any stamped features. Therefore, no specialized equipment such as large presses are required for forming the first plate 12. The second plates 18 are of a size which permits them to be economically produced by conventional forming equipment. The second plates, for example, are preferably stamped to provide (and define or at least partially define) a plurality of fluid flow passages. Where the size of first plate 12 is too large to permit the heat exchanger 10 to be joined together by furnace brazing, the second plates 18 may be sealingly joined to the first plate 12 by laser welding.

As shown in FIG. 2, the first and second plates 12, 18 are joined together with their inner surfaces 14, 20 in opposed facing relation to one another, and with portions of the inner surfaces 14, 20 being spaced apart from one another. For example, in one embodiment, each second plate 18 has a central, generally planar base 24 surrounded by a raised peripheral side wall 26 extending from the base 24 to a planar peripheral flange 28 defining a planar peripheral sealing surface 30 on the inner surface 20 of second plate 18.

Preferably, each heat exchanger element further comprises at least one fluid flow passage 34 for flow of a heat transfer fluid, the at least one fluid flow passage 34 being located between the spaced apart portions of the inner surfaces 14, 20 of the first and second plates 12, 18. In this regard, the planar base 24 of second plate 18 is provided with a plurality of spaced apart ribs 70 which define (in combination with inner surface 14 of first plate 12) the at least one fluid flow passage 34. The ribs 70 extend upwardly out of the plane of the planar base 24 and have a sufficient height such that the flat or rounded top surface of each rib 70 defines a sealing surface which is substantially co-planar with the sealing surface 30 of planar flange 28. During assembly of heat exchanger 10, the sealing surface 30 of planar flange 28 and the sealing surfaces of the ribs 70 are sealingly joined to the inner surface 14 of first plate 12, such that the inner surface 14 of first plate 12 defines the top wall of the at least one fluid flow passage 34, the planar base 24 of second plate 18 defines the bottom wall of the at least one fluid flow passage 34, and the ribs 70 and peripheral side wall 26 together define the sides of the at least one fluid flow passage 34.

As shown in FIG. 3, the second plates 18 each have a length (along y-axis) and a width (along x-axis), and are shown as being elongate in the length dimension. The ribs 70 are also elongated along the length dimension of the second plate 18, and the pattern of ribs 70 is configured to provide each heat exchanger element with a plurality of fluid flow passages 34 defining a "counterflow" flow pattern, in which a plurality of cold channels and a plurality of hot channels are arranged in an alternating orientation across the width (along x-axis) of the second plate 18.

The ribs 70 of each second plate 18 are preferably configured as elongated U-shapes, having a pair of elongated legs 72, 74 (along y-axis) joined by a transverse rib portion 76. The ribs 70 are arranged in two groups 78, 80 which are spaced apart from one another along the length dimension of the second plate 18, with the ribs 70 of each group 78, 80 being spaced apart across the width dimension of the second plate. The closed ends of the U-shaped ribs 70 are located proximate to the middle of second plate 18, while the open ends of ribs 70 are located proximate to the (lengthwise) ends of the second plate 18, spaced from the sidewall 26 and flange 28.

The fluid flow passages 34 each have an open first end 36 defined as a space between a pair of adjacent U-shaped ribs 70 (or between a U-shaped rib 70 and the sidewall 26/flange 28), and a second end 38 located between the legs 72, 74 of one of the ribs 70, proximate to the transverse rib portion 76. Each fluid flow passage 34 therefore has a generally U-shaped configuration, with the flow changing direction in a turnaround area 82 defined between the open ends of the U-shaped ribs 70 and the sidewall 26/flange 28 at the opposite ends of second plate 18.

Each second plate 18 further preferably comprises at least one first inlet port 40 and at least one first outlet port 42. In one embodiment, the at least one first inlet port 40 comprises a continuous, transversely extending slot (along x-axis) through the second plate 18, which is located proximate to the middle of second plate 18, between the first and second groups 78, 80 of ribs 70. The central area of second plate 18 between the two groups 78, 80 of ribs 70 therefore provides an internal manifold area 84 within which fluid from the at least one first inlet port 40 is distributed across the width of the second plate 18 and supplied to the open first ends 36 of the fluid flow passages 34.

In one embodiment, the at least one first outlet port 42 comprises a plurality of apertures through the second plate 18, each of which is provided at or proximate to the second end 38 of a fluid flow passage 34, i.e. between the legs 72, 74 of one of the ribs 70, proximate to the transverse rib portion 76.

Therefore, with this arrangement, it can be seen that each fluid flow passage includes a cold channel (receiving cold fluid from first inlet port 40) and a hot channel (discharging hot fluid to the first outlet port 42), with the hot and cold channels being arranged in alternating order across the width of the second plate 18. It will be appreciated that the flow of heat transfer fluid can be reversed so that the first inlet port 40 becomes the outlet port, and the first outlet port 42 becomes the inlet. Furthermore, although each fluid flow passage 34 is defined as a U-shaped passage which changes direction in turnaround area 82, it will be appreciated that there will necessarily be some mixing of flow and transverse flow distribution between fluid flow passages 34 in the turnaround area 82, since the fluid flow passages 34 are not separated from one another in area 82.

As shown in FIG. 4 (and in FIG. 1B), heat exchanger 10 further comprises an external manifold portion 44 which, in one embodiment, extends transversely across the heat exchanger 10 and the second plates 18 (along x-axis). The external manifold portion 44 comprises a second inlet port 46 through which the heat transfer fluid is supplied to heat exchanger 10 through the external manifold portion 44, and a second outlet port 48 through which the heat transfer fluid is discharged from the heat exchanger 10 through the external manifold portion 44. The second inlet and outlet ports 46, 48 may be provided with tubular fluid fittings (such as tubular fluid fitting 50, 52 shown in FIG. 20) to permit the second inlet and outlet ports 46, 48 to be connected to the battery heating/cooling system of the vehicle (not shown).

The external manifold portion 44 further comprises an inlet manifold channel 54 in fluid communication with the at least one first inlet port 40 of each heat exchanger element and with the second inlet port 46, and an outlet manifold channel 56 in fluid communication with the at least one first outlet port 42 of each heat exchanger element and with the second outlet port 48. Therefore, the external manifold portion 44 distributes and supplies the heat transfer fluid to each of the heat exchanger elements 40 through the second plate 18 thereof. The external manifold portion 44 also receives the heat transfer fluid from each heat exchanger element through the second plate 18 thereof, in order to collect and discharge the heat transfer fluid from the heat exchanger elements.

As shown in FIG. 4, in one embodiment the external manifold portion 44 is formed separately from the first and second plates 12, 18, and is comprised of three plates sealingly joined together, and sealingly joined to the outer surfaces 22 (FIG. 3) of the second plates 18, for example by mechanical sealing or by metallurgical bonding such as brazing or welding. The three plates are identified herein as the inner plate 58, middle plate 60 and outer plate 62.

The inner plate 58 is preferably flat and provided with a plurality of inlet apertures 64 and outlet apertures 66, which are shaped, sized and arranged on inner plate 58 so as to align with the first inlet and outlet ports 40, 42 of the plurality of second plates 18.

The middle plate 60 preferably comprises a dished plate is provided with embossments in the form of elongate ribs which partly define the inlet and outlet manifold channels 54, 56. In this regard, a central embossment 86 is aligned with the central row of inlet apertures 64 of inner plate 58, and has an open end 88 to permit the heat transfer fluid to enter the space enclosed by embossment 86 and inner plate 58. The middle plate 60 also includes a pair of outer embossments 90, each of which is aligned with one of the two rows of outlet apertures 66 of the inner plate 58. The outer embossments 90 are joined at one end, with the middle plate 60 being provided with an aperture 92 through which the heat transfer fluid is discharged from the pair of outer embossments 90. The areas enclosed between the outer embossments 90 (including the portion in which aperture 92 is formed) and the inner plate 58 define the outlet manifold channel 56. It can be seen that the spaces between the inner and outer embossments 86, 90 form part of the inlet manifold channel 54.

The outer plate 62 is preferably in the form of a dished plate which nests with the middle plate 60, and is provided with a pair of openings, namely an outlet aperture 94 which aligns with the outlet aperture 92 in middle plate 60 and is open to the outlet manifold channel 56, and an inlet aperture 96 which is open to the inlet manifold channel 54. The inlet aperture 96 defines the second inlet port 46 of the external manifold portion 44, and the aligned outlet apertures 92, 94 define the second outlet port 48 of the external manifold portion 44. In one embodiment the second inlet and outlet ports 46, 48 are located proximate to one end of the external manifold portion 44, although it will be appreciated that the locations of the ports 46, 48 can be varied.

In one embodiment, heat transfer fluid is able to flow through inlet aperture 96 and second inlet port 46 (of the external manifold portion 44), through inlet manifold channel 54 (along the x-axis/transverse direction), and into open end 88 and the x-axis/transverse channel within central embossment 86. From central embossment 86 (of the external manifold portion 44), fluid is able to flow through inlet aperture 64 and into the second plate 18 via first inlet port 40. From inlet port 40, fluid is able to flow (primarily) in a lengthwise (y-axis) direction toward the ends of the second plate 18 via fluid flow passage 34. Fluid may then turn around at the open ends of ribs 70 to thereafter flow back toward the middle of the second plate 18 and though first outlet port 42. From first outlet port 42 (of the second plate 18) fluid is able to flow into outlet aperture 66 (of the external manifold portion 44) and through (x-axis/transverse running) outlet manifold channel 56. From outlet manifold channel 56 fluid is able to flow out of the external manifold via discharge outlet aperture 92 and outlet aperture 94.

In preferred embodiments, the heat exchanger 10 further comprises at least one stiffening element arranged between adjacent heat exchanger elements in the array, in order to limit deflection between the adjacent heat exchanger elements. The at least one stiffening element of heat exchanger 10 is now explained below with reference to FIGS. 6 to 8.

Figure 6:
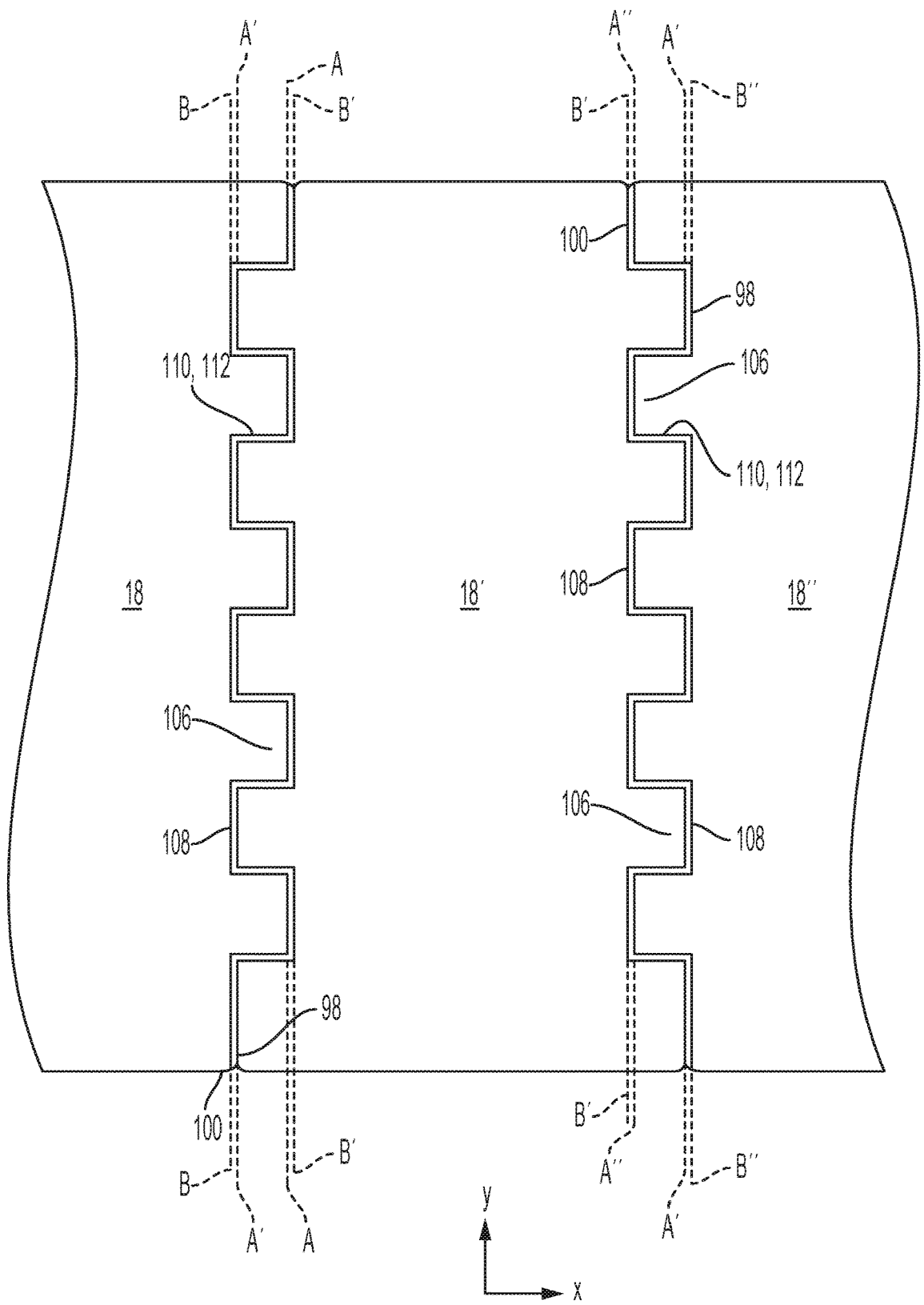
FIG. 6 is a partial bottom plan view of a heat exchanger as in FIG. 1A.

As mentioned above, the second plate 18 of each heat exchanger element includes a planar peripheral flange 28 surrounding the at least one fluid flow passage 34, and flange 28 defines a planar peripheral sealing surface 30 along which the inner surface 20 of the second plate 18 is sealingly joined to the inner surface 14 of the first plate 12. As shown in FIGS. 3 and 6, each second plate 18 has first and second side edges 98, 100 defining the longer sides of the second plate 18 and extending along the y-axis. Each second plate 18 also has first and second end edges (extending between first side edge 98 and second side edge 100) defining the shorter sides of the second plate 18 and extending along the x-axis. In the array of heat exchanger elements making up heat exchanger 10, the side edges 98, 100 of all the second plates 18 are at least generally parallel to one another, and the end edges of all the second plates 18 are at least generally parallel to one another.

The planar flange 28 includes relatively wide side portions (width of side portions measured along x-axis) which extend along the side edges 98, 100, and also includes relatively narrow end portions (width of end portions measured along y-axis) which extend along the end edges 102, 104. The reason for the wider side portions of planar flange 28 will become apparent from the description below, although it will be appreciated that the width of the planar flange 28 at various areas around the periphery of the second plate 18 can be varied from that shown in the drawings.

Referring more specifically to the side edges 98, 100 of the second plates 18, it can be seen that the width of the planar flange 28 along the side edges 98, 100 of second plate 18 (as measured along the x-axis) varies along the length of the side edges 98, 100 (as measured along the y-axis).

As shown in FIG. 6, each of the side portions of the peripheral flange 28 extending along the side edges 98, 100 of each second plate 18 includes at least one outermost edge portion 106, each of the outermost edge portions 106 extending along at least a portion of the side edge 98 or 100. A first axis A is defined along the at least one outermost edge portion 108. In one embodiment, there is a plurality of outermost edge portions 106 along each of the side edges 98, 100, the plurality of outermost edge portions 106 being spaced apart from one another along the length of the side edge 98 or 100. The outermost edge portions 106 in one embodiment correspond to the widest areas (or tabs) in the side portions of the peripheral flange 28.

Also as shown in FIG. 6, each of the side portions of the peripheral flange 28 extending along the side edges 98, 100 of each second plate 18 also includes at least one innermost edge portion 108, each of the innermost edge portions 108 extending along at least a portion of the side edge 98 or 100. A second axis B is defined along the at least one innermost edge portion 108. In one embodiment, there is a plurality of innermost edge portions 108 along each of the side edges 98, 100, the plurality of innermost edge portions 108 being spaced apart from one another along the length of the side edge 98 or 100. The innermost edge portions 106 in one embodiment correspond to the narrowest areas (or cutouts, or knotches, each of which is adjacent to a wider area/tab) in the side portions of the peripheral flange. The first and second axes A, B are parallel to one another and to axis-y.

As shown in FIG. 6, the second plates 18, 18', 18" of the heat exchanger elements are each in side-by-side arrangement along the x-axis, wherein each of the second plates 18, 18', 18" has at least one of its side edges 98, 100 positioned with its first axis A, A', A" located between the first and second axes of an adjacent one of the second plates. For example, the first axis A of second plate 18 is positioned between the first axis A' and the second axis B' of an adjacent second plate 18'. Similarly, the first axis A' of the second plate 18' is positioned between the first axis A" and second axis B" of an adjacent second plate 18".

In the arrangement shown in FIG. 6, the outermost side edges 106 and innermost side edges 108 alternate with one another along each of the side edges 98, 100. In each adjacent pair of second plates 18, the outermost edge portions 106 and innermost edge portions 108 of the adjacent second plates 18 have a complementary arrangement and shape. In this regard, each of the outermost edge portions 106 defines a male portion of the peripheral flange 28 and each of the innermost edge portions 108 defines a female portion of peripheral flange 28. The male portions defined by outermost edge portions 106 are arranged in opposed relation to the female portions defined by the innermost edge portions 108, and are shaped so as to be received in the female portions. In this way, the side edges 98, 100 of adjacent second plates 18 do not overlap one another, but rather are interengaged, interlaced, or fit together in jigsaw puzzle fashion, to define a non-linear joint line 110 between the side edges 98, 100 of adjacent second plates. Due to manufacturing tolerances, there will typically be a small gap 112 at the joint line 110, and this gap 112 is similarly non-linear, since it follows the profile of the alternating innermost and outermost portions 108, 106 of side edges 98, 100. The shapes of joint line 110 and gap 112 depend on the shapes of the innermost and outermost edge portions 108, 106, and may be described as meandering, tortuous, zig-zag or jagged.

In one embodiment, the plurality of stiffening elements are defined by the plurality of interlaced innermost and outermost edge portions 108, 106, which provide the non-linear joint line 110 and gap 112, and these stiffening elements increase rigidity between adjacent heat exchanger elements by eliminating a linear bending axis (or bend line) along/between the side edges 98, 100 of adjacent second plates 18. In addition, the provision of the non-linear joint line 110 and gap 112 may provide a more uniform joint between adjacent second plates 18, leading to more uniform deflection during internal pressure cycles and external loading.

Figure 7A:
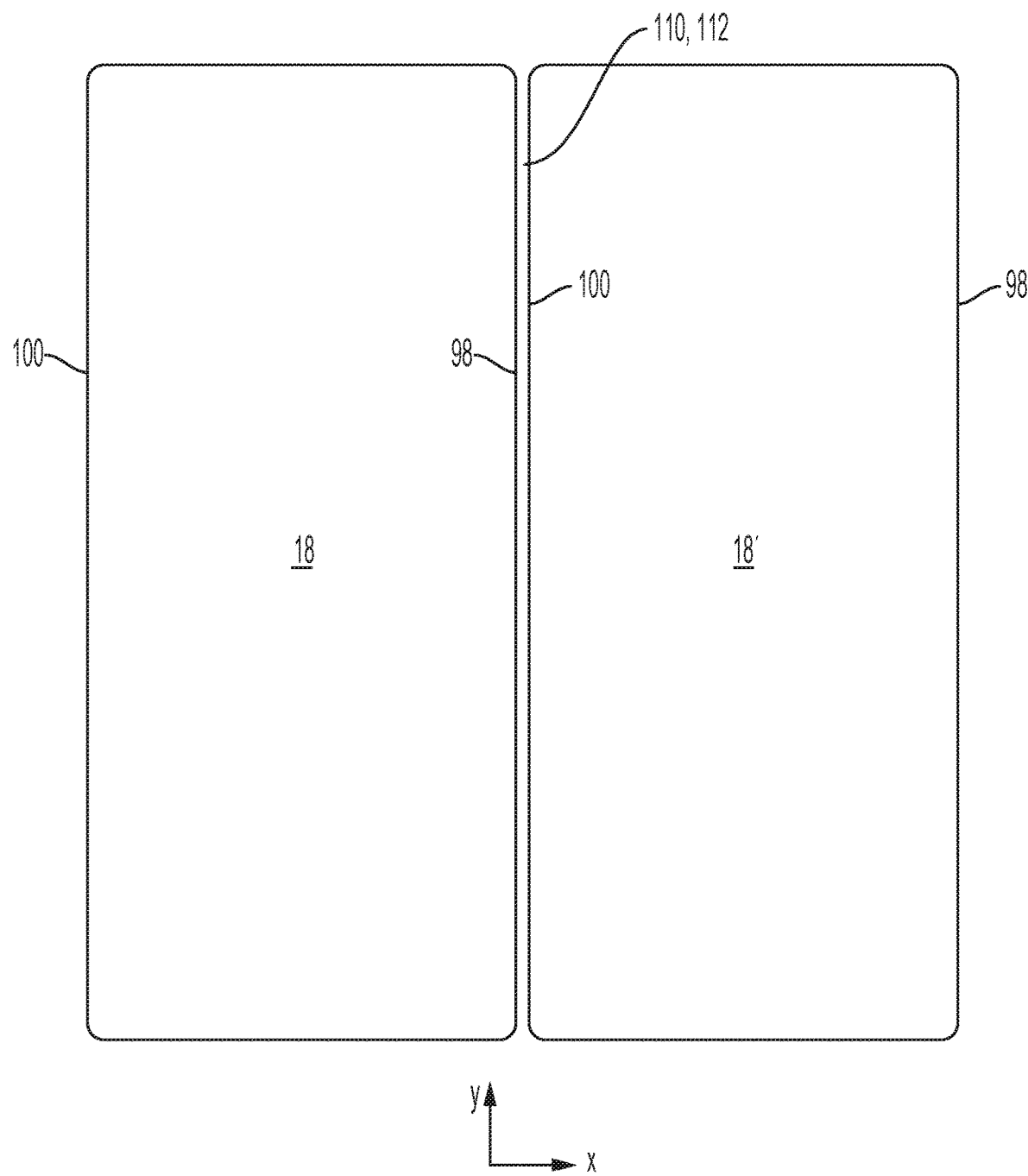
FIG. 7A is a partial bottom plan view of a prior art heat exchanger.
Figure 7B:
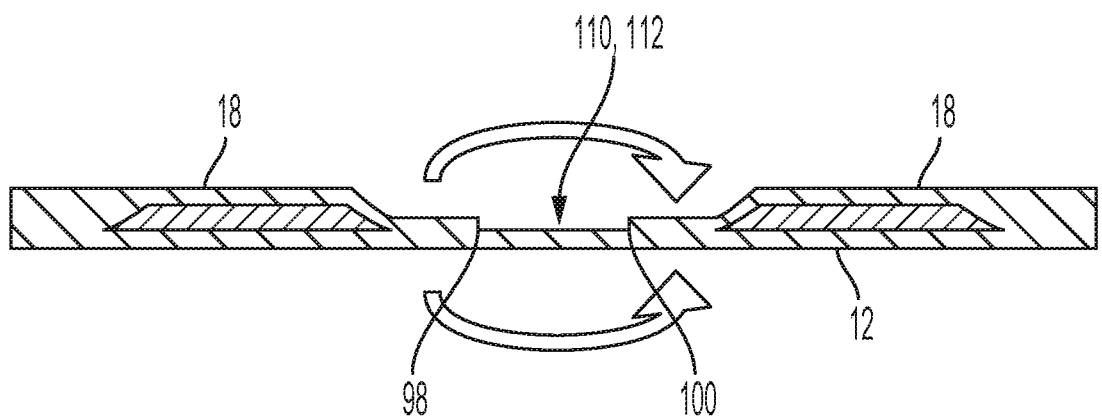
FIG. 7B is an enlarged cross-section of a prior art heat exchanger as in FIG. 7A.

The arrangement of is can be contrasted with prior art FIGS. 7A and 7B, showing side edges 98, 100 of a pair of adjacent second plates 18, 18' of a prior art heat exchanger as described in US 2016/0204486 A1. Similar reference numerals are used. As shown in FIGS. 7A and 7B, the two second plates 18 are sealingly joined to a first plate 12. In prior art heat exchanger, the side edges 98, 100 are straight and parallel to each other, and define a straight joint line 110 and a straight gap 112 between the first side edge 98 of one second plate 18 and the second side edge 100 of an adjacent second plate 18. In the gap 112, the heat exchanger is only one layer thick, i.e. being the thickness of first plate 12. The linear joint line 110 and gap 112 define a linear bending axis along which there can be deflection of the adjacent heat exchanger elements, for example during shipping, handling, installation and/or use of the heat exchanger.

Figure 8:
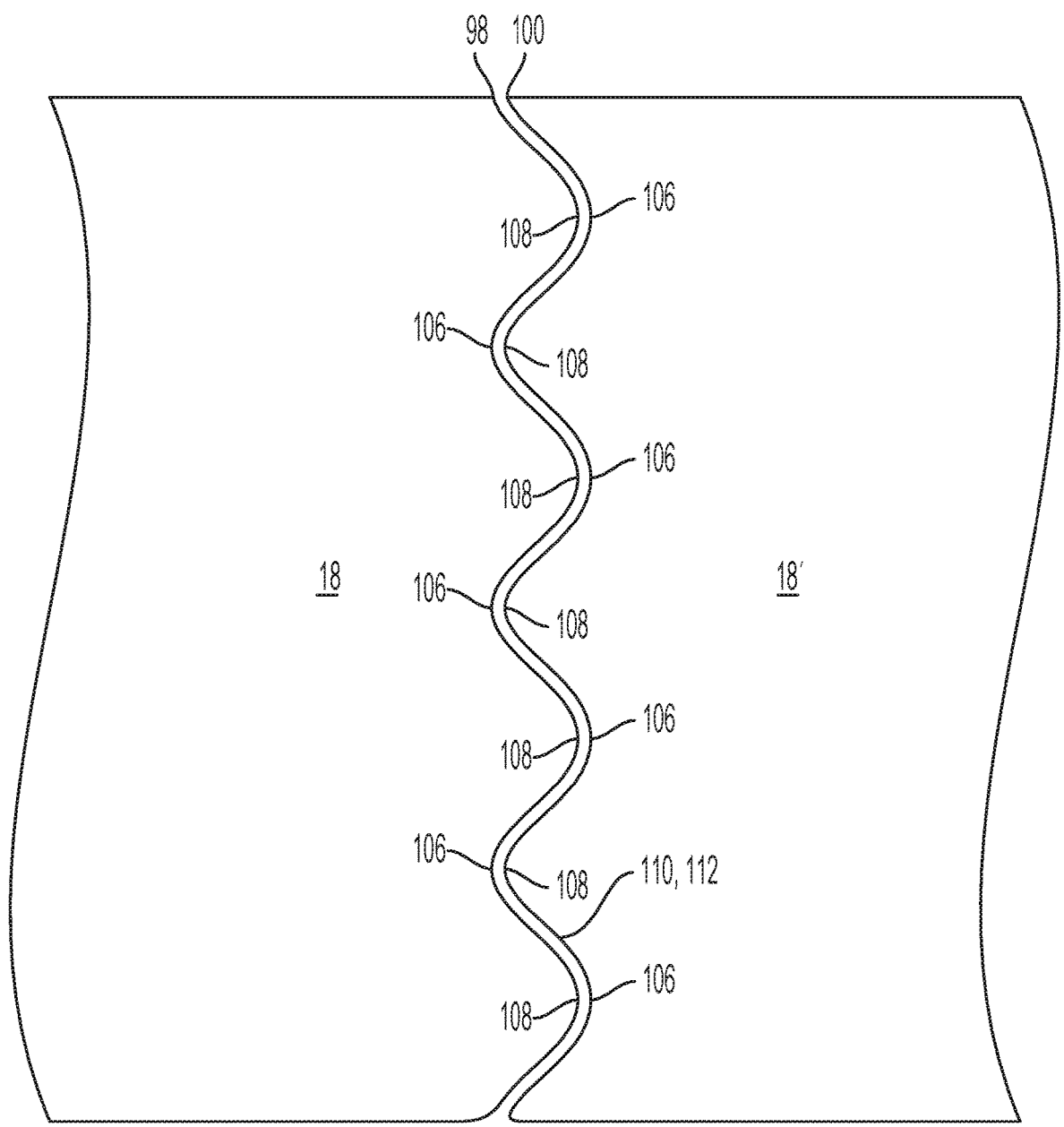
FIG. 8 is a partial bottom plan view of a heat exchanger which is a variant of the heat exchanger of FIG. 1.

Referring back to FIG. 6, the innermost and outermost edge portions 108, 106 of heat exchanger 10 are (as shown) rectangular, and provide each of the side edges 98, 100 with a series of rectangular castellations. However, it will be appreciated that other arrangements are possible. For example, as shown in FIG. 8, the side edges 98, 100 may have a more rounded arrangement so as to provide a joint line 110 and gap 112 which have a smoothly curved, meandering shape. In FIG. 8, adjacent second plates 18, 18' have side edges 98, 100 having wider (tab) areas 108 and narrower (cut) areas 106, which are rounded and not rectangular as in FIG. 6.

Figure 9A:
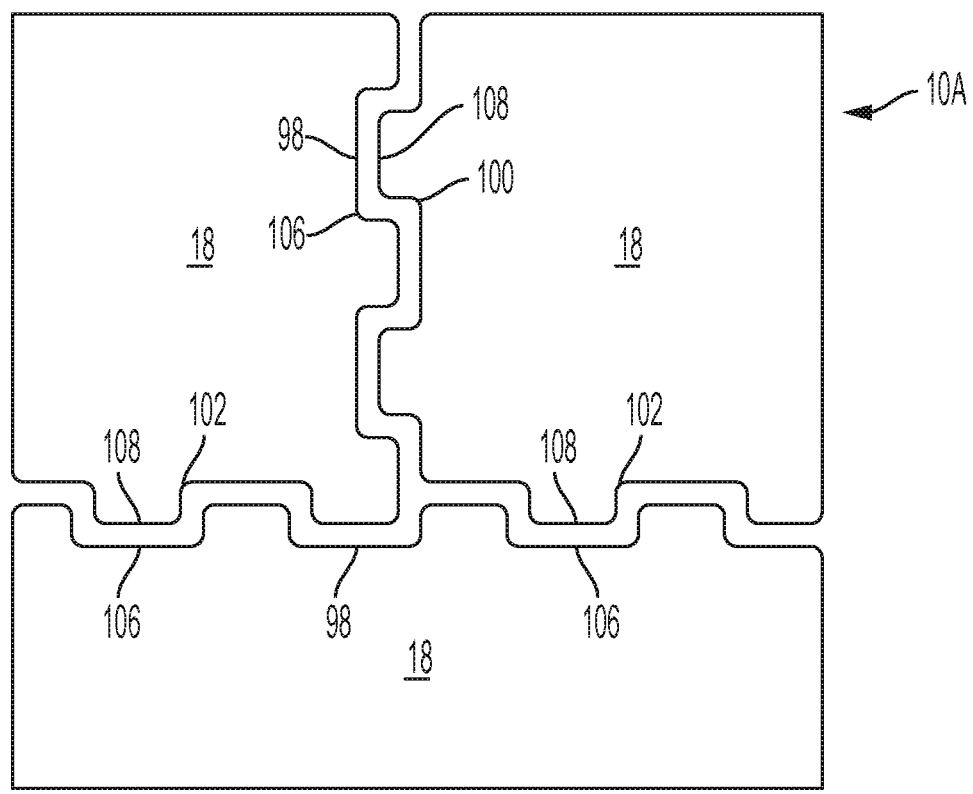
FIG. 9A is a partial bottom plan view of a heat exchanger which is a variant of a heat exchanger as in FIG. 1A.
Figure 9B:
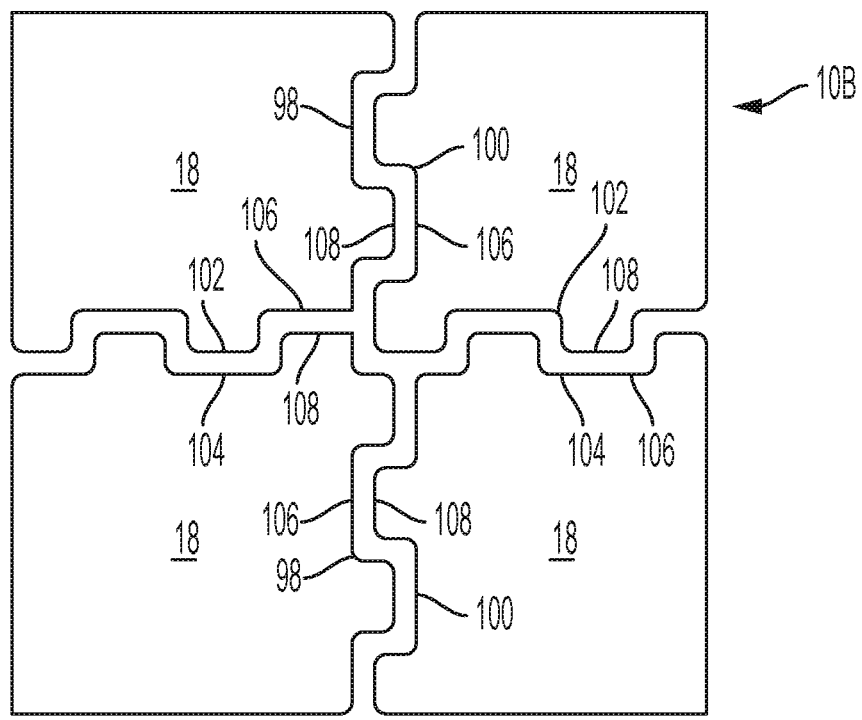
FIG. 9B is a partial bottom plan view of a heat exchanger which is a variant of a heat exchanger as in FIG. 1A.

The heat exchanger elements in FIG. 6 are arranged side-by-side, and not end-to-end. In other embodiments, the array may include heat exchanger elements arranged side-by-side, end-to-end, and/or end-to-side. Two such embodiments are shown in FIGS. 9A and 9B. FIG. 9A shows a portion of a heat exchanger 10A in which there is a convergence of three second plates 18 in side-by-side and side-to-end arrangements. FIG. 9B shows a portion of a heat exchanger 10B in which there is a convergence of four second plates 18 in side-by-side and end-to-end arrangements. In these types of arrays, both the side edges 98, 100 and the end edges 102, 104 of the second plates 18 may be provided with innermost and outermost edge portions.

Figure 10:
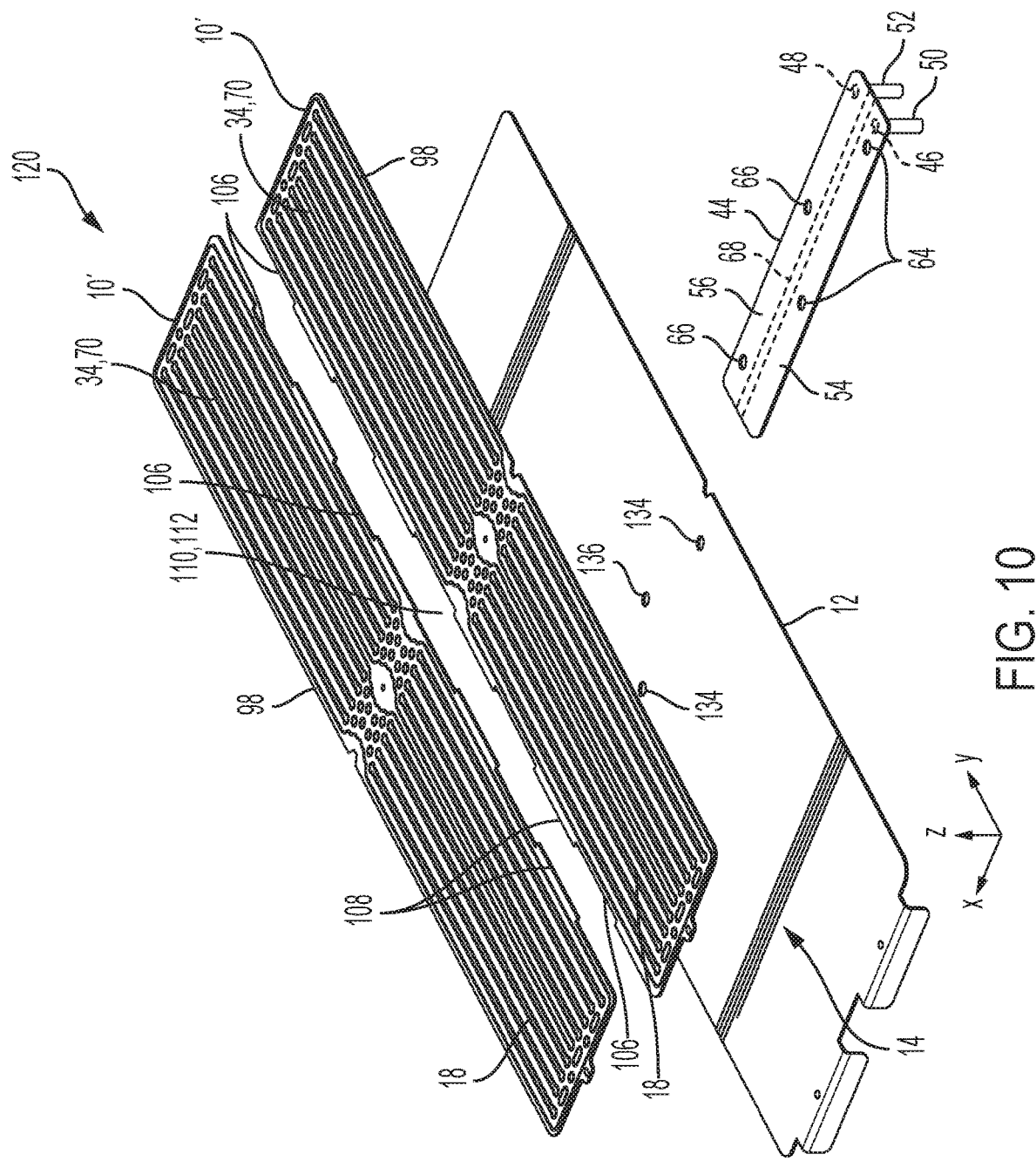
FIG. 10 is an exploded top perspective view of a heat exchanger according to an alternate embodiment.
Figure 11:
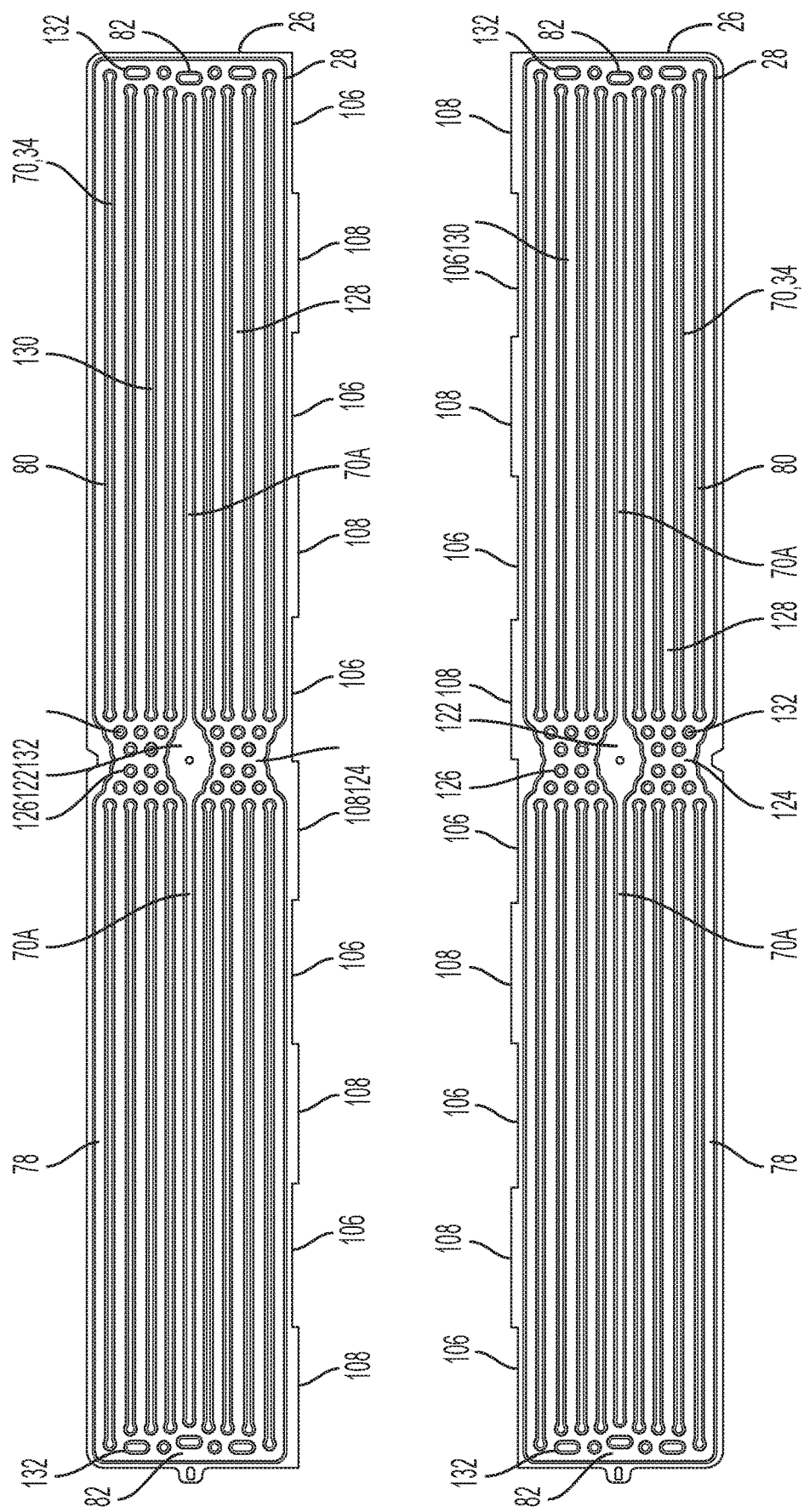
FIG. 11 is a top plan view showing two second plates of a heat exchanger as in FIG. 10.

FIGS. 10-11 show a heat exchanger 120 according to an alternate embodiment which shares a number of like elements with heat exchanger 10 as in FIG. 1. These like elements are described with like reference numerals and the following discussion will focus on differences between heat exchangers 10 (FIG. 1) and 120 (FIG. 10).

As shown in FIG. 10, heat exchanger 120 comprises a first plate 12 and a pair of second plates 18, forming two heat exchanger elements 10'. Each second plate 18 has only one side edge 98 or 100 provided with innermost (cut) and outermost (tab) edge portions 106, 108 as described above (for similarly oriented cuts/cutouts and tabs), to provide a non-linear joint line 110 and gap 112 between the two second plates 18. Because each second plate 18 has only one side edge 98 or 100 along which it is adjacent to another second plate 18, the innermost and outermost edge portions 106, 108 are provided along only one side edge 98 or 100 of each second plate 18.

The second plates 18 include a pattern of ribs 70 which are configured to provide each heat exchanger element with a plurality of fluid flow passages 34 defining a "U-flow" flow pattern. The ribs 70 are linear and parallel, and are arranged in two groups 78, 80 which are spaced apart from one another along the length dimension of the second plate 18. The central rib 70 in each group 78, 80 is labeled 70A in FIG. 11, having a first end, near the middle of second plate 18, which is joined to a flow blocking embossment 122, and an opposite second end which terminates in turnaround area 82, and is spaced from the sidewall 26 and planar flange 28 at one of the ends of the second plate 18.

The flow blocking embossment 122 separates an inlet manifold area 124 from an outlet manifold area 126, and the central ribs 70A separate an inlet portion 128 and an outlet portion 130 of the second plate 18. The remaining ribs 70 have first ends which terminate in either the inlet manifold area 124 or the outlet manifold area 126, and second ends which terminate in the turnaround area 82. The ribs 70 separate the inlet and outlet portions 128, 130 into individual fluid flow passages 34.

To provide structural support, the inlet and outlet manifold areas 124, 126 and the turnaround areas 82 may be provided with additional spaced-apart embossments such as dimples 132.

In heat exchanger 120 the external manifold portion 44 shown in FIG. 10 is in the form of a flat tube closed along its sides and ends, and sealingly joined to the outer surface 16 of the first plate 12 and extending across the first plate 12, along the x-axis. The external manifold portion 44 includes inlet and outlet openings 46, 48 provided with inlet and outlet fittings 50, 52. The surface of manifold portion 44 which is in engagement with the outer surface 16 of first plate 12 includes inlet and outlet apertures 64, 66 which are aligned and in communication with fluid inlet and outlet openings 134, 136 of first plate 12 (FIG. 10). The inlet openings 134 of first plate 12 provide fluid communication between the inlet manifold area 124 and an inlet manifold channel 54 of the external manifold portion 44, and outlet openings 136 provide fluid communication between the outlet manifold area 126 and an outlet manifold channel 56 of the external manifold portion 44. The inlet and outlet manifold portions 54, 56 of external manifold portion 44 are in flow communication with the respective inlet and outlet ports 40, 42, and are separated from one another by a dividing rib 68 extending along the x-axis. It can be seen that the inlet and outlet apertures 64, 66 of external manifold portion 44 are arranged on opposite sides of the dividing rib 68, and the fluid inlet and outlet openings 134, 136 are staggered along the y-axis so as to align with the inlet and outlet apertures 64, 66 of external manifold portion 44. Instead of comprising a single flat tube with an internal dividing rib 68, it will be appreciated that the external manifold portion 44 may comprise two separate flat tube structures enclosing the respective inlet and outlet manifold portions 54, 46.

Figure 12:
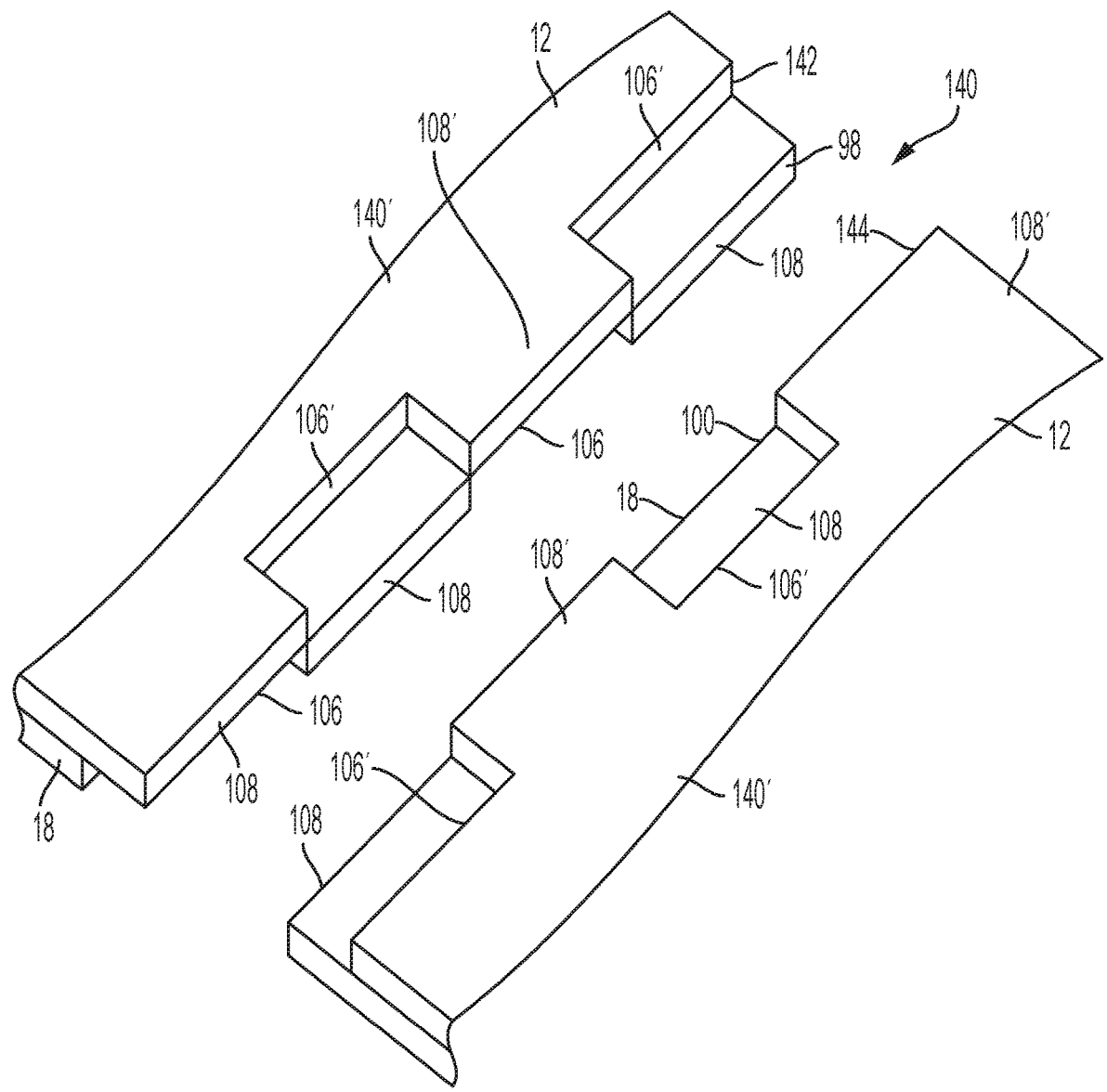
FIG. 12 is a perspective view of portions of a pair of adjacent heat exchanger elements of a heat exchanger according to an alternate embodiment.
Figure 13:
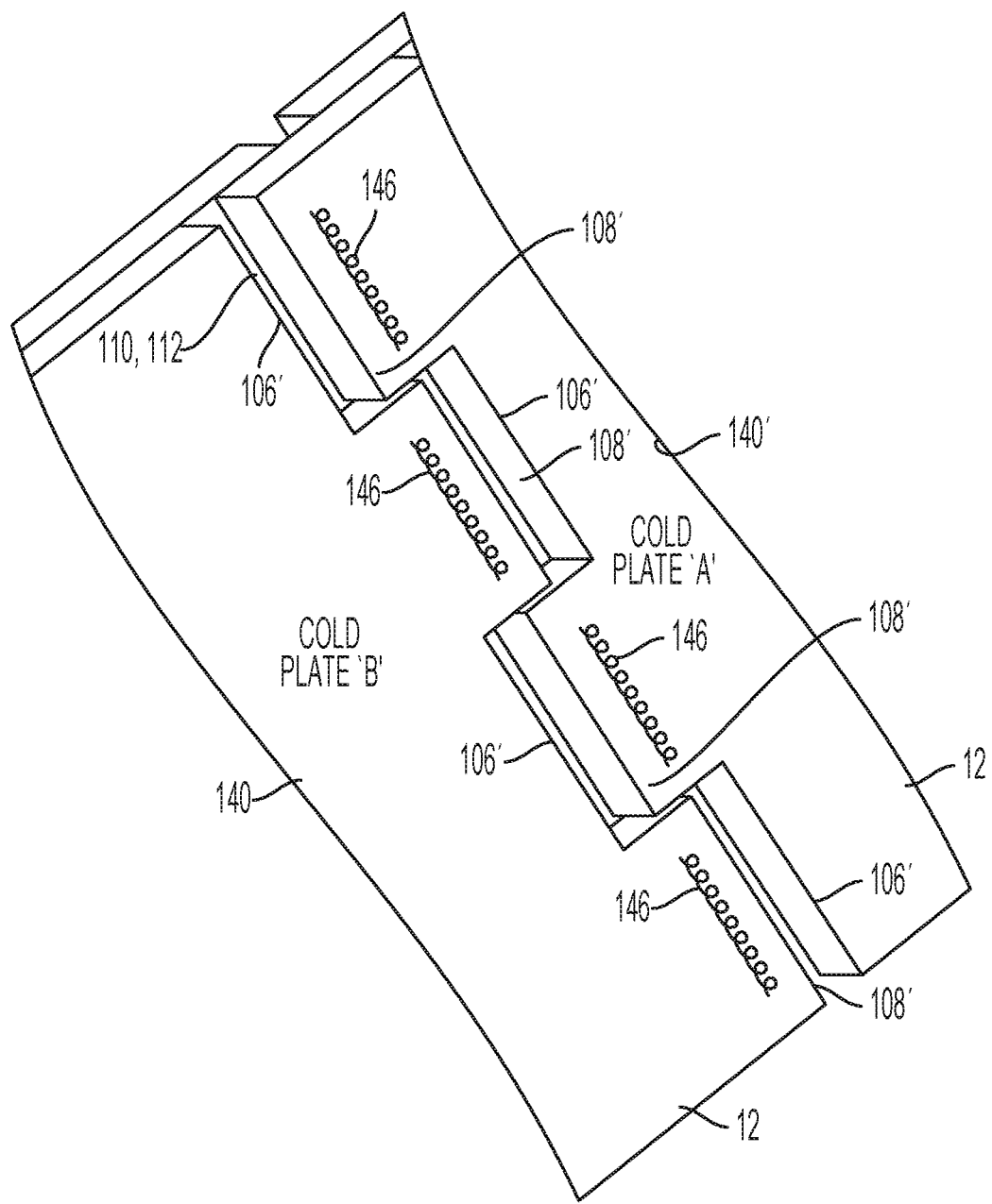
FIG. 13 is a perspective view showing adjacent heat exchanger elements as in FIG. 12 secured together.

FIGS. 12-13 illustrate portions of a heat exchanger 140 according to an alternate embodiment. Heat exchanger 140 shares a number of like elements with heat exchangers 10 and/or 120. These like elements are described with like reference numerals.

Heat exchanger 140 comprises a plurality of heat exchanger elements 140', each comprising a first plate 12 and a second plate 18. In heat exchanger 140, the first plates 12 of the plurality of heat exchanger elements 140' are separately formed, such that both the first plate 12 and the second plate 18 of each heat exchanger element 140' have at least approximately the same area, the first plate 12 of each heat exchanger element 140' including a pair of side edges 142, 144. With the heat exchanger elements 140' arranged side-by-side, at least one side edge 142 or 144 of the first plate 12 of one heat exchanger element 140' is in opposed facing relation, and substantially co-planar with, a side edge 142 or 144 of an adjacent heat exchanger element 140'.

As described above with reference to heat exchanger 10 and 120, each of the second plates 18 of the heat exchanger elements 140' is provided with a plurality of alternating innermost and outermost edge portions 106, 108 along at least one of its side edges 98, 100. According to one embodiment, the first plates 12 of the heat exchanger elements 140' are similarly provided with a plurality of alternating innermost and outermost edge portions 106', 108' along at least one of its side edges 142, 144.

At least one of the side edges 98, 100, 142, 144 of the first and second plates 12, 18 in each heat exchanger element 140' are configured such that each of the innermost edge portions 106' of the first plate 12 overlies (overlaps) one of the outermost portions 108 of the second plate 18, and each of the outermost portions 108' of the first plate 12 overlies (overlaps) one of the innermost portions 106 of the second plate 18. It can be seen from FIG. 12 that upper and lower rows of projecting tabs are thus formed along the side edges 98, 100, 142, 144 of the first and second plates 12, 18, wherein at least one side of each heat exchanger element 140' is formed in this fashion. Each of the projecting tabs of the upper row comprises an outermost portion 108' of one of the first plates 12, and each of the projecting tabs of the lower row comprises an outermost portion 108 of one of the second plates 18.

With the heat exchanger elements 140' arranged in a side-by-side array, as in heat exchangers 10 and 120, each adjacent pair of heat exchanger elements 140' is arranged with the upper row of projecting tabs of one of the heat exchanger elements 140' overlapping the lower row of projecting tabs of the other heat exchanger element 140', and vice versa. In this way, the side edges 98, 100, 142, 144 the first and second plates 12, 18 of adjacent heat exchanger elements 140' are interengaged, interlaced, or fit together in jigsaw puzzle fashion, to define non-linear joint lines 110 between the side edges 98, 100 of adjacent second plates 18, and similar non-linear joint lines 110' between the side edges 142, 144 of adjacent first plates 12. Furthermore, the overlapping projecting tabs provided by the outermost edge portions 108', 108 of the first and second plates 12, 18 provide an interlocking connection between the side edges 98, 100, 142, 144, and provide surfaces along which the side edges 98, 100, 142, 144 may be secured together, for example by welding or by mechanical fastening, either with fasteners such as rivets, or without fasteners, for example by press-joining. FIG. 13 shows weld joints 146 through the overlapping outermost edge portions 108', 108.

Figure 14:
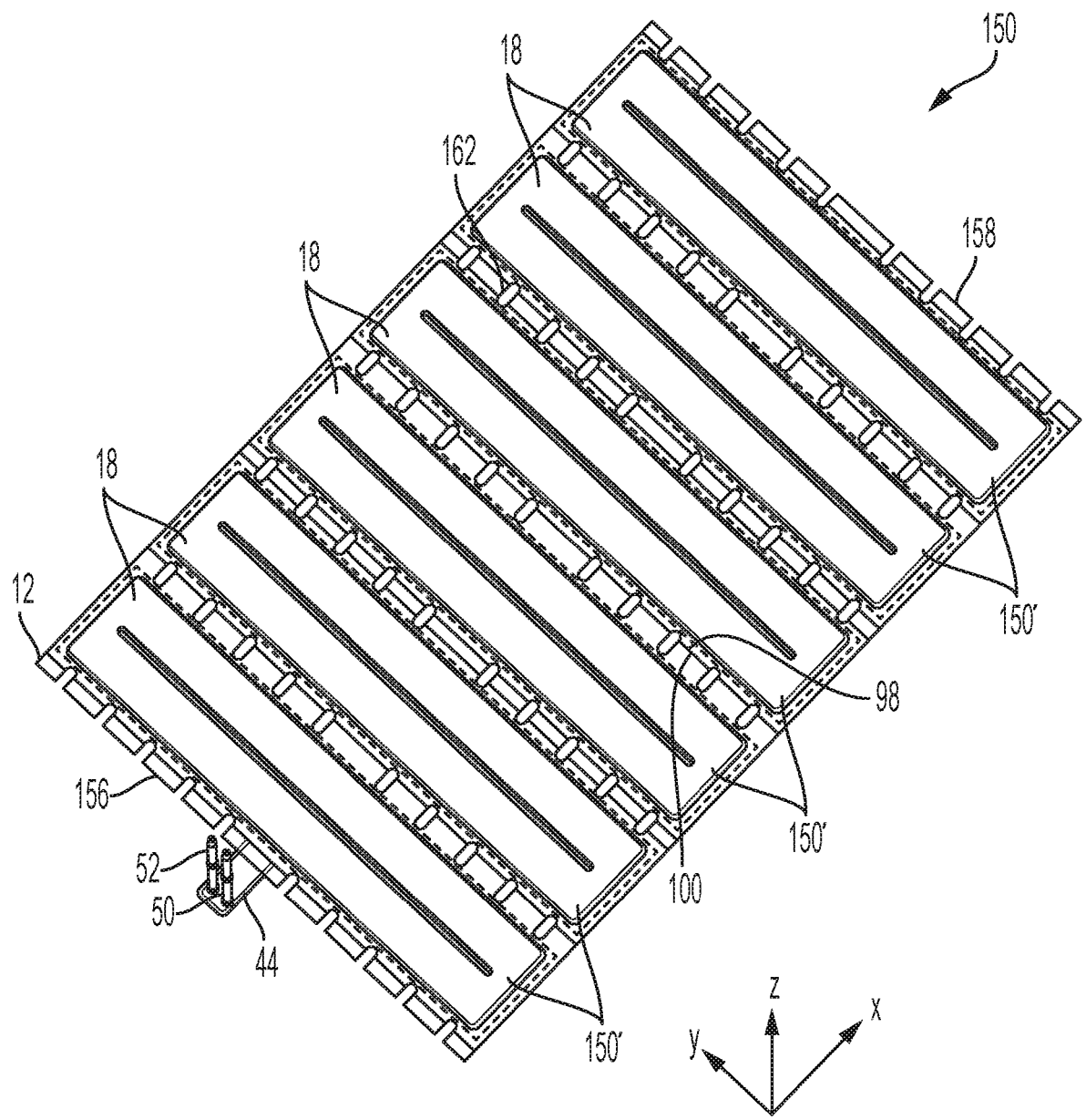
FIG. 14 is a top perspective view of a heat exchanger according to an alternate embodiment.
Figure 15C:
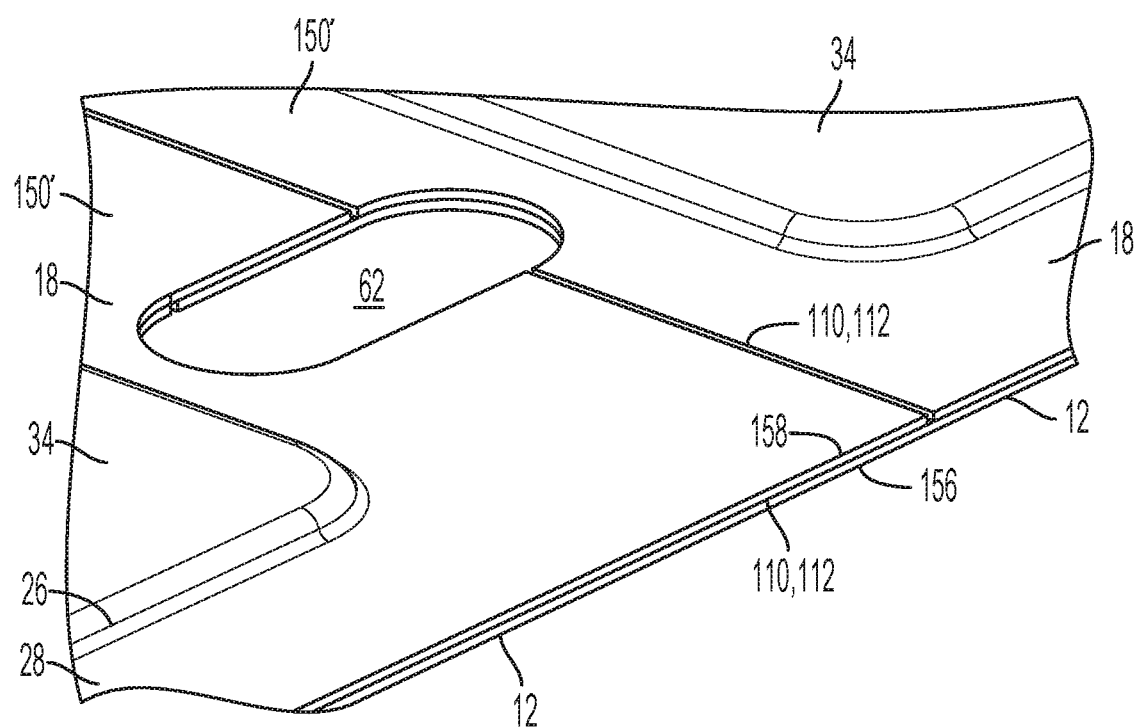
FIG. 15C is a close-up of a portion of two heat exchanger elements joined together as in FIG. 15B.

FIGS. 14-15C illustrate a heat exchanger 150 according to an alternate embodiment. Heat exchanger 150 shares a number of like elements with heat exchangers 10, 120 and/or 140. These like elements are described with like reference numerals.

Heat exchanger 150 comprises a plurality of heat exchanger elements 150', each comprising a first plate 12 and a second plate 18. In heat exchanger 150, the first plates 12 of the plurality of heat exchanger elements 150' are separately formed, such that both the first plate 12 and the second plate 18 of each heat exchanger element 150' have at least approximately the same area, the first plate 12 of each heat exchanger element 150' including a pair of side edges 152, 154. With the heat exchanger elements 150' arranged side-by-side, at least one side edge 152 or 154 of the first plate 12 of one heat exchanger element 150' is in opposed facing relation, and substantially co-planar with, a side edge 152 or 154 of an adjacent heat exchanger element 150'. Heat exchanger 150 further comprises an external manifold portion 44 which extends transversely across the heat exchanger 150 and specifically across the outer surfaces 16 of the first plates 12 (along x-axis), and is similar or identical in structure to external manifold portion 44 of heat exchanger 120 described above.

The external manifold portion 44 of heat exchanger 150 comprises a flat tube closed along its sides and ends, and sealingly joined to the outer surface 16 of the first plate 12 and extending across the first plate 12, along the x-axis. The external manifold portion 44 includes inlet and outlet openings 46, 48 (not shown) provided with inlet and outlet fittings 50, 52. Although not shown, the surface of manifold portion 44 which is in engagement with the outer surface 16 of first plate 12 includes inlet and outlet apertures 64, 66 on opposite sides of a dividing rib (such as diving rib 68 shown in FIG. 10), the apertures 64, 66 being aligned and in communication with respective fluid inlet and outlet openings 134, 136 of first plate 12, as in heat exchanger 120.

An upper projecting tab 156 or a lower projecting tab 158 is defined along at least one side of each heat exchanger element 150'. Each upper projecting tab 156 comprises a portion of the first plate 12, located inwardly of one of the side edges 152 or 154, and projecting outwardly beyond the side edge 98 or 100 of the second plate 18. Conversely, each lower projecting tab 158 comprises a portion of the second plate 18, located inwardly of one of the side edges 98, 100, and projecting outwardly beyond the side edge 152 or 154 of the first plate 12.

With the heat exchanger elements 150' arranged in a side-by-side array, as in heat exchangers 10, 120 and 140, each adjacent pair of heat exchanger elements 150' is arranged with the upper projecting tab 156 of one of the heat exchanger elements 150' overlapping the lower projecting tab 158 of the other heat exchanger element 150'. In this way, the overlapping side edges 98, 100, 152, 154 the first and second plates 12, 18 of adjacent heat exchanger elements 150' are overlapped to provide a lap joint between adjacent heat exchanger elements 150' and provide surfaces along which the side edges 98, 100, 152, 154 may be secured together, for example by welding or by mechanical fastening, either with fasteners such as rivets, or without fasteners, for example by press-joining. FIG. 15A shows weld joints 160 through the overlapping upper and lower tabs 156, 158.

It will be appreciated that the upper and lower tabs 156, 158 may either extend continuously along the side edges 98, 100, 152, 154, or they may be discontinues, for example being interrupted by cutouts 162 as shown in FIGS. 14, 15A and 15B (and cutout 62 in FIG. 15C).

Each of the heat exchanger elements 140', 150' of heat exchangers 140 and 150 may be similar or identical in size and shape to conventional brazed cold plate heat exchangers, thereby allowing the heat exchanger elements 140', 150' to be manufactured in a conventional manner, using conventional shaping equipment and furnace brazing. The heat exchanger elements 140', 150' can then be secured together side-by-side in the manner described above to form heat exchangers 140, 150 having a plurality of heat exchanger elements 140', 150', and provided with external manifold portions as described herein. Similar end-to-end joining of heat exchanger elements 140', 150' can be accomplished by providing the end edges of first and second plates 12, 18 with similarly formed projecting tabs as described above with reference to side edges 98, 100, 142, 144, 152, 154.

FIGS. 16-17 illustrate a heat exchanger 170 according to an alternate embodiment. Heat exchanger 170 shares a number of like elements with heat exchangers 10, 120, 140 and/or 150. These like elements are described with like reference numerals.

Heat exchanger 170 comprises a plurality of heat exchanger elements 170', each comprising a first plate 12 and a second plate 18. As in heat exchangers 10 and 120, heat exchanger 170 includes a single, integral first plate 12 to which a plurality of second plates 18 are sealingly joined in side-by-side arrangement. The second plates 18 of heat exchanger 170 are generally similar to the second plates 18 of heat exchanger 120 described above, each second plate 18 having side edges 98, 100, and having a pattern of ribs 70 which are configured to provide each heat exchanger element 170' with a plurality of fluid flow passages 34 defining a "U-flow" flow pattern. The ribs 70 are linear and parallel, and are arranged in two groups 78, 80 which are spaced apart from one another along the length dimension of the second plate 18. The central rib 70 in each group 78, 80 is labeled 70A, having a first end, near the middle of second plate 18, which is joined to a flow blocking embossment 122.

In heat exchangers 10 and 120, the spacing between the side edges 98, 100 of adjacent second plates 18 is minimized. In contrast, the side edges 98, 100 of second plates 18 of heat exchanger 170 are intentionally spaced apart across the inner surface 14 of first plate 12, along the x-axis. In the spaces along the sides of second plates 18 and between adjacent second plates 18 there are provided stiffening elements in the form of stiffening ribs 172. In particular, there is a plurality of such stiffening ribs 172 between each adjacent pair of second plates 18, wherein the stiffening ribs 172 between each pair of second plates 18 are spaced apart and arranged in a row along the y-axis.

The stiffening ribs 172 are formed as embossments in the first plate 12, and at least some of the ribs 172 may be elongated parallel to an axis (the x-axis) which is perpendicular to the side edges 98, 100 of the second plates 18. Alternatively, at least some of the ribs 172 may be circular or any other convenient shape. In one embodiment, the outer surfaces 22 of second plates 18 form the surfaces on which the battery cells and/or modules are supported, and the embossments comprising stiffening ribs 172 are formed so as to protrude from the outer surface 16 of the first plate 12, i.e. away from the surfaces on which the battery cells and/or modules are supported.

In addition to being embossed with stiffening ribs 172, the first plate 12 of heat exchanger 170 differs from the flat first plates 12 of heat exchangers 10 and 120 in other important respects. In this regard, the first plate 12 is formed of two plate layers, including an inner plate layer 174 (FIG. 16) defining the inner surface 14 of first plate 12, and an outer plate layer 176 (FIG. 17) defining the outer surface 16 of first plate 12. Also, the external manifold portion 44 is integrated with the first plate 12, with the outer plate layer 176 including a pair of elongate embossments 178, 180, wherein the inlet and outlet manifold channels 54, 56 are formed between the inner plate layer 174 and the embossments 178, 180 of the outer plate layer 176, and with the inlet and outlet ports 40, 42 being provided through the first plate 12 as shown in FIG. 16. The inlet and outlet ports 40, 42 may be provided with fittings (not shown), which may extend from the inner surface 14 of first plate 12. Although not visible in the drawings, the inner plate layer 174 has inlet and outlet manifold openings in communication with the fluid flow passages 34 defined between the first plate 12 and the second plates 18. The embossments 178, 180 and the external manifold portion 44 of heat exchanger 170 extend along the x-axis, i.e. the axis which is perpendicular to the side edges 98, 100 of the second plates 18, and therefore also serve to enhance the stiffness of the heat exchanger 170 along the x-axis.

The heat exchanger 170 according to one embodiment may be constructed by welding together inner and outer plate layers 174, 176 to provide the first plate 12 and external manifold portion, and by welding together the second plates 18 and the first plate 12. Instead of having two layers 174, 176 with an integrally formed external manifold portion 44, it will be appreciated that the first plate 12 may comprise a single layer, and the external manifold portion 44 may be formed separately from first plate 12, as in the embodiments described above. Also, instead of comprising two separate embossments 178, 180, the external manifold portion 44 may comprise a single flat tube with an internal dividing rib, as in the external manifold portions 44 of heat exchangers 120 and 150 described above.

FIGS. 18-21 illustrate a heat exchanger 190 according to an alternate embodiment. Heat exchanger 190 shares a number of like elements with heat exchangers 10, 120, 140, 150 and/or 170. These like elements are described with like reference numerals.

Heat exchanger 190 is similar to heat exchangers 140 and 150 in that it comprises a plurality of heat exchanger elements 190', each comprising a first plate 12 and a second plate 18. In heat exchanger 190, the first plates 12 of the plurality of heat exchanger elements 190' are separately formed, such that both the first plate 12 and the second plate 18 of each heat exchanger element 190' have at least approximately the same area, the first plate 12 of each heat exchanger element 190' including a pair of side edges 192, 194. With the heat exchanger elements 190' arranged side-by-side, at least one side edge 192 or 194 of the first plate 12 of one heat exchanger element 190' is in opposed facing relation, and substantially co-planar with, a side edge 192 or 194 of an adjacent heat exchanger element 190'.

The first plates 12 of heat exchanger 190 are flat and the outer surfaces 16 of the first plates 12 define the surfaces on which the battery cells and/or modules are supported. The second plates 18 are similar to those of heat exchanger 170 described above, each second plate 18 having side edges 98, 100, and having a pattern of ribs 70 which are configured to provide each heat exchanger element 190' with a plurality of fluid flow passages 34 defining a "U-flow" flow pattern. The rib structure of heat exchanger elements 190' is relatively simple, however, in that only includes two central ribs 70, each having a first end, near the middle of second plate 18, which is joined to a flow blocking embossment 122.

Heat exchanger 190 differs from heat exchangers 140, 150 in that the at least one stiffening element between adjacent heat exchanger elements 190' in the side-by-side array do not necessarily include any connections between adjacent heat exchanger elements 190', in the manner of heater exchangers 140, 150 discussed above. Rather, in heat exchanger 190, the at least one stiffening element between adjacent heat exchanger elements 190' is provided by the external manifold portion 44, as described below.

In this regard, the external manifold portion 44 comprises a flattened tubular structure enclosing both the inlet manifold channel 54 and the outlet manifold channel 56, separated by an internal dividing rib (such as dividing rib/internal barrier 208). The external manifold portion 44 extends across all the heat exchanger elements 190' along an axis (the x-axis) which is perpendicular to the side edges 192, 194 of the first plate 12 and the side edges 98, 100 of the second plate 18.

The at least one stiffening element of heat exchanger 190 comprises a plurality of bends in the external manifold portion 44, wherein the bends are arranged to separate a plurality of first and second portions of the external manifold portion 44. For example, in the illustrated embodiments, the external manifold portion 44 includes a plurality of first portions 196, each of which is flat and planar, and extends along the outer surface 16 of the first plate 12 of one of the heat exchanger elements 190'. The first portions 196 are all substantially co-planar with one another.

The external manifold portion 44 also includes a plurality of second portions 198 which are substantially co-planar with one another, the plane of the first portions 196 being substantially parallel to and spaced from the plane of the second portion 198 by an amount which is about the same as the thickness of the heat exchanger element 190'. In the illustrated embodiment, the second portions 198 may be substantially co-planar with the outer surfaces of the second plates 18.

Figure 20:
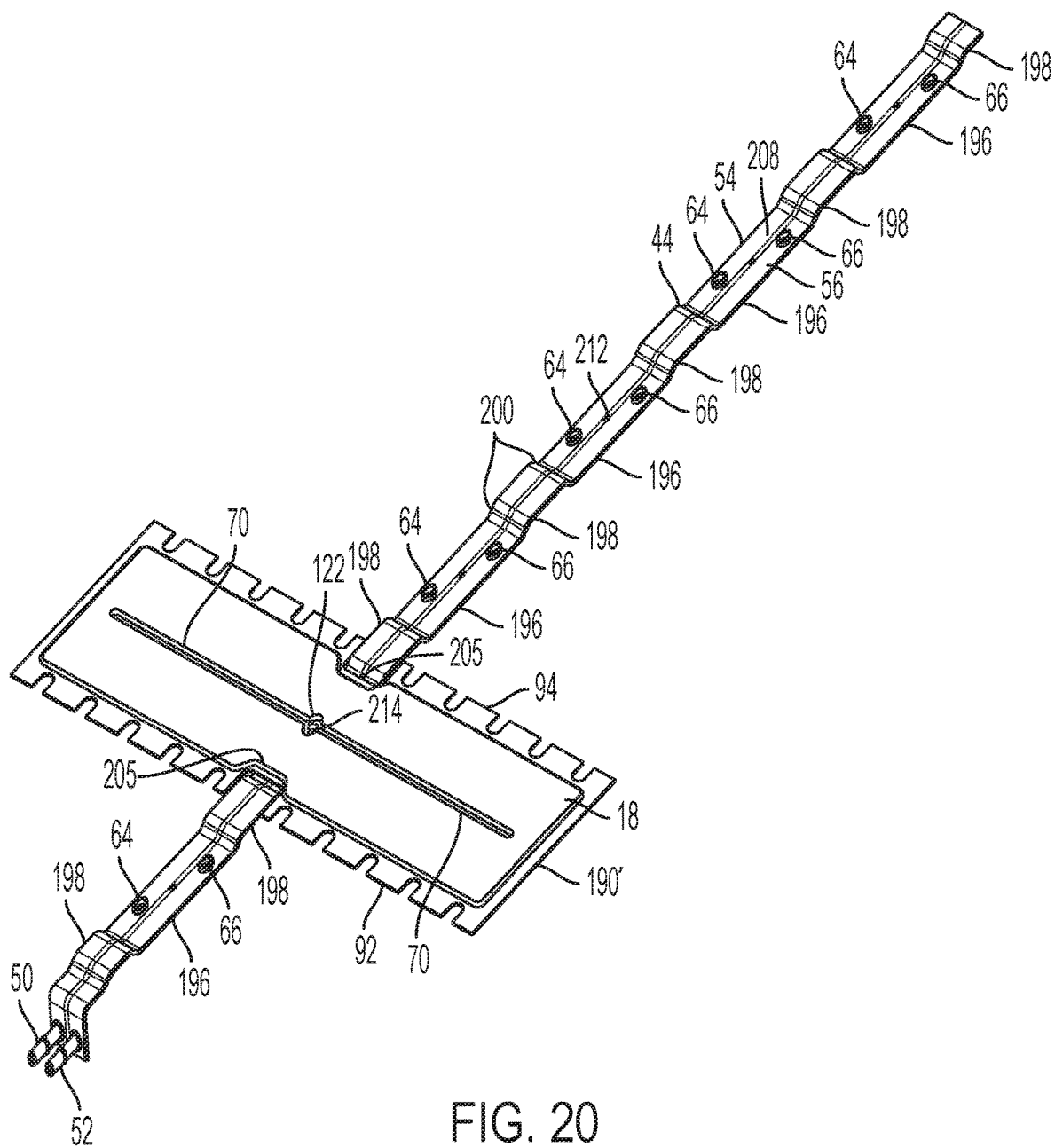
FIG. 20 is a bottom perspective view of a heat exchanger as in FIG. 18, with some heat exchanger elements removed.
Figure 21:
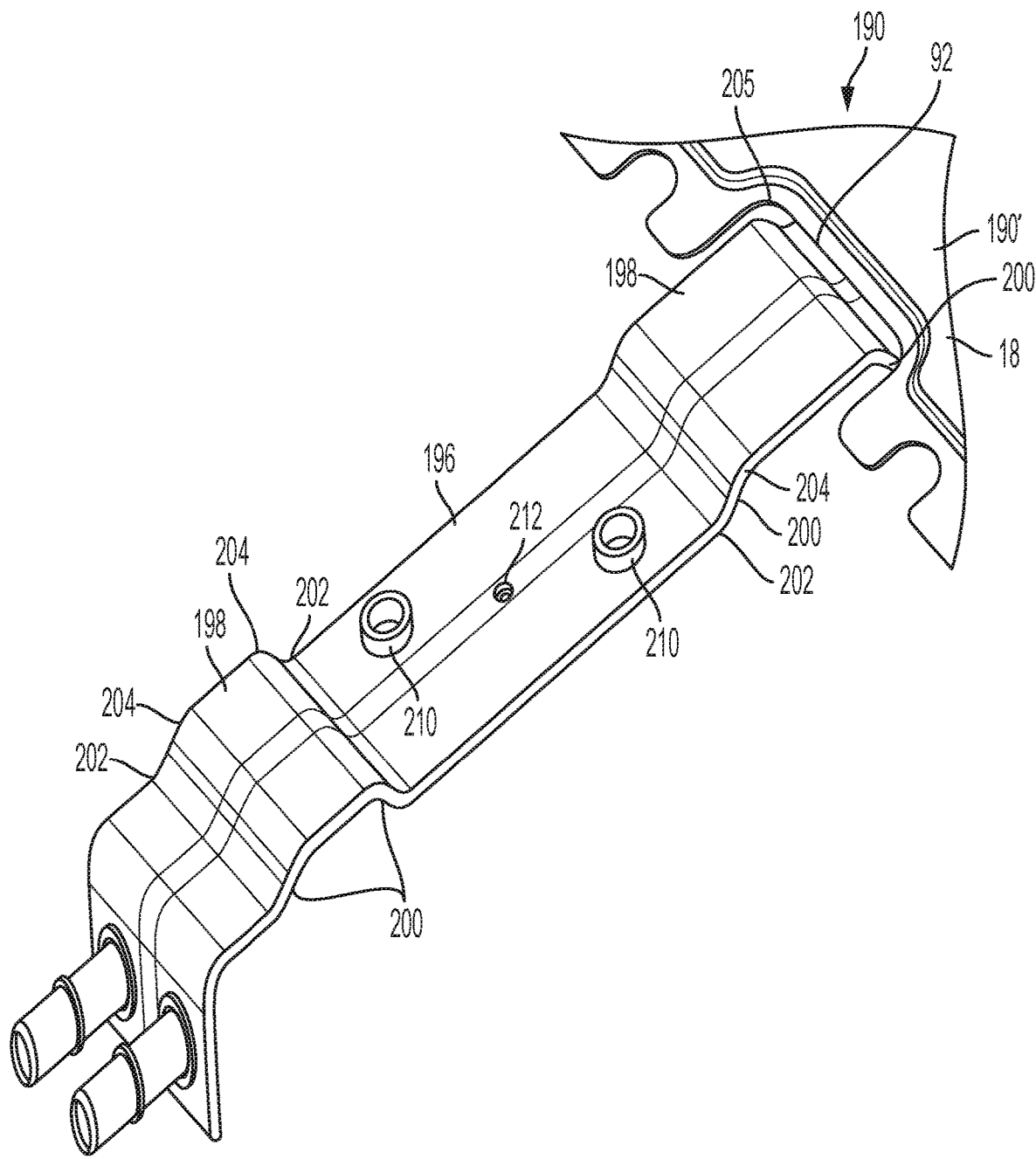
FIG. 21 is an enlarged close-up of a portion of an external manifold portion of a heat exchanger as in FIG. 20.

As best seen in FIGS. 20 and 21, the first and second portions 196, 198 are separated by inclined shoulders 200, each of which is formed by a pair of opposite bends 202, 204 (FIG. 21) proximate to the side edges 98, 100, 192, 194 of the first and second plates 12, 18.

The side edges 98, 100, 192, 194 have inwardly extending portions 205 near the middle of each heat exchanger element 190', such that apertures 206 (FIG. 19) are provided between the middle portions of adjacent heat exchanger elements 190'. The second portions 198 of the external manifold portion 44 are received in these apertures 206.

As shown in FIG. 20, the inlet and outlet manifold channels 54, 56 of external manifold portion 44 may be separated by an internal barrier 208, and the inlet and outlet apertures 64, 66 of the external manifold portion 44 are formed on either side of the internal barrier 208, in communication with inlet and outlet ports formed through the first plate 12 (not shown). To enable mechanical connection of the external manifold portion 44 to the heat exchanger elements 190', resilient sealing elements such as O-rings 210 are provided between the inlet and outlet apertures 64, 66 of the external manifold portion 44 and the inlet and outlet ports of the first plate 12. Also, fastener holes 212, 214 are provided through the respective external manifold portion 44 and the heat exchanger elements 190'. The holes 212, 214 are adapted to receive fasteners (not shown) such as screws or bolts, for fastening the manifold portion 44 and heat exchanger elements 190' together, and optionally for fastening the heat exchanger 190 to a support structure (not shown).

The fastener holes 212 of the external manifold portion 44 may extend through the second portions 198, for example through the internal barrier 208 and proximate to the inlet and outlet apertures 64, 66. The fastener holes 214 of the heat exchanger elements 190' may extend through the first plate 12 and through the flow-blocking embossment 122 in the second plate 18.

The external manifold portion 44 is also provided with first and second tubular fittings 50, 52 for connection to the battery heating/cooling system of the vehicle (not shown).

It will be appreciated that each of the heat exchangers described herein may optionally be provided with one or more electric heating element (such as, for example, an electric heating element) for heating the heat transfer fluid (or thermal regulating fluid) flowing through the heat exchanger, and/or with one or more chiller (or cooling element) (such as, for example, an electric cooling element) for cooling the heat transfer fluid flowing through the heat exchanger.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the terms "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger, comprising:
   (a) a plurality of heat exchanger elements, wherein each of the heat exchanger elements comprises:
      (i) a first plate having an inner surface and an outer surface;
      (ii) a second plate having an inner surface and an outer surface, wherein the first and second plates are joined together with their inner surfaces in opposed facing relation to one another, and with portions of the inner surfaces being spaced apart from one another;
      (iii) at least one fluid flow passage adapted for flow of a heat transfer fluid, and located between the spaced apart portions of the inner surfaces of the first and second plates;
      (iv) at least one first inlet port for supplying the heat transfer fluid to the plurality of fluid flow passages; and
      (v) at least one first outlet port for discharging the heat transfer fluid from the plurality of fluid flow passages; and
   (b) an external manifold portion comprising:
      (i) a second inlet port for supplying the heat transfer fluid to the external manifold portion;
      (ii) a second outlet port for discharging the heat transfer fluid from the external manifold portion;
      (iii) an inlet manifold channel in fluid communication with the at least one first inlet port of each said heat exchanger element and with the second inlet port of the external manifold portion; and
      (iv) an outlet manifold channel in fluid communication with the at least one first outlet port of each said heat exchanger element and with the second outlet port of the external manifold portion; and wherein the plurality of heat exchanger elements are arranged in a planar array;
   wherein at least one of the first plate and the second plate includes a pair of side edges, and wherein the side edges of the second plate are defined by opposed outer edges of a planar peripheral flange;
   wherein at least one of the side edges includes a plurality of outermost edge portions and a plurality of innermost edge portions, wherein the outermost and innermost edge portions alternate with one another along a length of the at least one side edge to provide a plurality of stiffening elements,
   wherein a gap is provided between adjacent pairs of side edges, the gap being tortuous and following along the innermost and outermost edge portions of the side edges.

2. The heat exchanger of claim 1, wherein the at least one stiffening element is arranged between adjacent heat exchanger elements in the array, to limit deflection between the adjacent heat exchanger elements in the array.

3. The heat exchanger of claim 1, wherein the second plate of each heat exchanger element includes a planar peripheral flange surrounding the at least one fluid flow passage and defining a sealing surface along which the inner surface of the second plate is sealingly joined to the inner surface of the first plate, wherein the first plate has a sealing surface along which the inner surface of the first plate is sealingly joined to the sealing surface of the second plate.

4. The heat exchanger of claim 3, wherein at least one of the side edges includes at least one outermost edge portion of the plurality of outermost edge portions, each of which extends along at least a portion of the side edge, and an innermost edge portion of the plurality of innermost edge portions extending along at least a portion of the side edge, wherein a first axis is defined along the at least one outermost edge portion, and a second axis is defined along the at least one innermost edge portion, wherein the second plates of the heat exchanger elements are arranged side-by-side such that each of the second plates has at least one of the side edges positioned with the first axis located between the first and second axes of the side edge of an adjacent one of the second plates, the side edges of adjacent pairs of second plates being co-planar with one another.

5. The heat exchanger of claim 4, wherein the first and second axes are parallel to one another, and transverse to an axis along which the external manifold extends.

6. The heat exchanger of claim 3, wherein the outermost edge portions and the innermost edge portions have a complementary arrangement and shape, such that each of the outermost edge portions defines a male portion and each of the innermost edge portions defines a female portion in which the male portion is received.

7. The heat exchanger of claim 1, wherein the first plates of the plurality of heat exchanger elements are integrally connected together to provide an integral first plate to which all the second plates are sealingly joined, and wherein the integral first plate has an area which is at least as great as a combined area of the plurality of second plates.

8. The heat exchanger of claim 1, wherein the first plates of the plurality of heat exchanger elements are separately formed, such that both the first plate and the second plate of each heat exchanger element include a pair of side edges, wherein, within each of the heat exchanger elements, each of the innermost edge portions of the first plate overlies one of the outermost edge portions of the second plate, and each of the outermost edge portions of the first plate overlies one of the innermost edge portions of the second plate, so as to provide alternating upper and lower rows of projecting tabs along the side edges of the first and second plates, wherein, with the heat exchanger elements arranged side-by-side in a planar array, an adjacent pair of the heat exchanger elements is arranged with an upper row of projecting tabs of a first heat exchanger element overlapping a lower row of projecting tabs of an adjacent second heat exchanger element, and with an upper row of projecting tabs of the second heat exchanger element overlapping a lower row of projecting tabs of the first heat exchanger element.

9. The heat exchanger of claim 8, wherein the upper row of projecting tabs of the first heat exchanger element is substantially co-planar with the upper row of projecting tabs of the second heat exchanger element, and wherein the lower row of projecting tabs of the first heat exchanger element is substantially co-planar with the lower row of projecting tabs of the second heat exchanger element.

10. The heat exchanger of claim 9, wherein the overlapping projecting tabs of the first and second heat exchanger elements are secured together.

11. The heat exchanger of claim 1, wherein the first plates of the plurality of heat exchanger elements are separately formed, such that both the first plate and the second plate of each heat exchanger element include a pair of side edges, wherein an upper or lower projecting tab is defined along at least one side of each of the heat exchanger elements, each upper projecting tab being formed by a portion of the first plate, inward of one of the side edges of the first plate, projecting outwardly beyond the side edge of the second plate, and each lower projecting tab being formed by a portion of the second plate, inward of one of the side edges of the second plate, projecting outwardly beyond the side edge of the first plate, wherein, with the heat exchanger elements arranged side-by-side in a planar array, an adjacent pair of the heat exchanger elements is arranged with the upper projecting tab of a first heat exchanger element overlapping the lower projecting tab of an adjacent second heat exchanger element, and wherein each pair of upper and lower projecting tabs in overlapping arrangement comprises the at least one stiffening element.

12. The heat exchanger of claim 11, wherein the upper projecting tab of the first heat exchanger element is co-planar with the upper projecting tab of the second heat exchanger element, and/or wherein the lower projecting tab of the first heat exchanger element is co-planar with the lower projecting tab of the second heat exchanger element.

13. The heat exchanger of claim 12, wherein the overlapping upper and lower projecting tabs of the first and second heat exchanger elements are secured together.

14. The heat exchanger of claim 1, wherein side edges of the second plates of adjacent heat exchanger elements are spaced apart from one another, wherein the first plates of the plurality of heat exchanger elements are integrally connected together to provide an integral first plate having an inner surface and an outer surface, wherein the second plates are sealingly joined to the inner surface of the integral first plate, and the integral first plate has an area which is greater than a combined area of the plurality of second plates, wherein the at least one stiffening element comprises a plurality of spaced apart ribs formed in the first plate and located between the side edges of adjacent heat exchanger elements.

15. The heat exchanger of claim 14, wherein the ribs are elongated parallel to an axis which is perpendicular to the side edges of the second plates, wherein the external manifold portion is provided along the outer surface of the integral first plate, and wherein the external manifold portion extends along the axis which is perpendicular to the side edges of the second plates.

16. The heat exchanger of claim 1, wherein in each of the heat exchanger elements, the first plate has a pair of side edges and the first and second plates of each heat exchanger element are sealingly joined together, and wherein the external manifold portion comprises a flattened tubular structure enclosing both the inlet manifold channel and the outlet manifold channel, the external manifold portion extending across all the heat exchanger elements along an axis which is perpendicular to the side edges of the first and second plates, wherein the at least one stiffening element comprises a plurality of bends in the external manifold portion, wherein the bends creating first and second portions of the external manifold portion which are located in different planes and which are separated by inclined shoulders, wherein the first portions located in a first plane and the second portions located in a second plane, the first and second planes being parallel and spaced apart by approximately a thickness of the heat exchanger elements.

17. The heat exchanger of claim 16, wherein each of the first portions extends along an outer surface of one of the second plates, and each of the second portions is located in an aperture provided between an adjacent pair of heat exchanger elements.

18. The heat exchanger of claim 16, wherein each of the inclined shoulders is formed by a pair of opposite bends proximate to the side edges of the first and second plates.

19. The heat exchanger of claim 16, wherein each of the first portions of the external manifold portion is mechanically secured to one of the heat exchanger elements.

* * * * *